(12) United States Patent
Engelhardt

(10) Patent No.: US 7,655,884 B2
(45) Date of Patent: Feb. 2, 2010

(54) OVEN WITH ROTATING DECK AND CONTROL SYSTEM FOR SAME

(76) Inventor: Bernard H. Engelhardt, 40 Lancer Drive, Maple, Ontario (CA) L6A 1C9

( * ) Notice: Subject to any disclaimer, the term of this patent is extended or adjusted under 35 U.S.C. 154(b) by 237 days.

(21) Appl. No.: 11/280,811

(22) Filed: Nov. 17, 2005

(65) Prior Publication Data

US 2007/0108177 A1   May 17, 2007

(51) Int. Cl.
 *F27B 9/06* (2006.01)
(52) U.S. Cl. ................ 219/388; 219/391; 219/393; 219/394
(58) Field of Classification Search ............ 219/217, 219/388, 405, 411, 413, 418, 412, 414, 506, 219/707, 391, 393, 394; 99/421, 433, 349, 99/334; 126/21 A; 392/416, 417, 418
See application file for complete search history.

(56) References Cited

U.S. PATENT DOCUMENTS

| | | | |
|---|---|---|---|
| 1,163,807 A | 12/1915 | Bower | |
| 1,787,469 A | 4/1929 | Blier | |
| 1,870,476 A | 2/1931 | Babcock | |
| 2,542,265 A | 2/1951 | Staples | |
| 2,591,072 A | 4/1952 | Hughes | |
| 4,305,329 A | 12/1981 | Fenoglio | |
| 4,506,652 A * | 3/1985 | Baker et al. | ............... 126/21 A |
| 4,753,472 A | 6/1988 | Fout | |
| 4,924,763 A | 5/1990 | Bingham | |
| 5,077,460 A * | 12/1991 | Rocha et al. | ................ 219/217 |
| 5,704,278 A | 1/1998 | Cross | |
| 5,773,800 A * | 6/1998 | Choy | ......................... 219/707 |
| 5,850,780 A | 12/1998 | Mascia et al. | |

* cited by examiner

*Primary Examiner*—Tu B Hoang
*Assistant Examiner*—Vinod D Patel
(74) *Attorney, Agent, or Firm*—Bereskin & Parr

(57) ABSTRACT

An oven has a housing, a heat source, and an aperture defined in the housing. A substantially horizontal deck rotates within the housing, and a number of substantially horizontal pallets are mounted on the deck to rotate relative to the deck. Each pallet has a lip. A source of motive power and a transmission system drive the main deck to revolve within the housing, and also drive the pallets to rotate relative to the main deck. The transmission system constrains rotational movement of the pallets relative to the main deck and causes each pallet to be oriented with its stopping member positioned opposite the aperture whenever that pallet is aligned with the aperture. The oven has a control system that monitors the length of time that an item remains in the oven, permitting items having different cooking times to be cooked simultaneously, even when introduced in a random order.

2 Claims, 13 Drawing Sheets

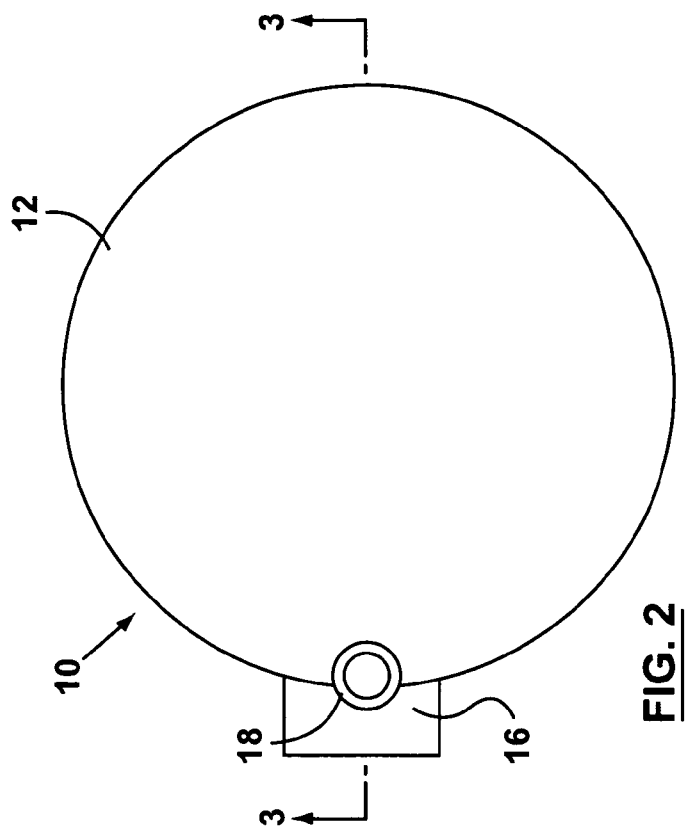
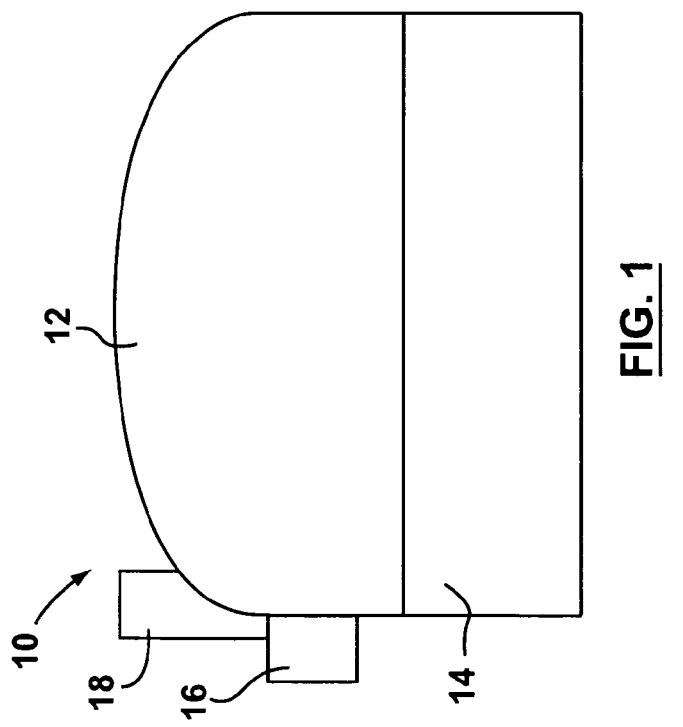

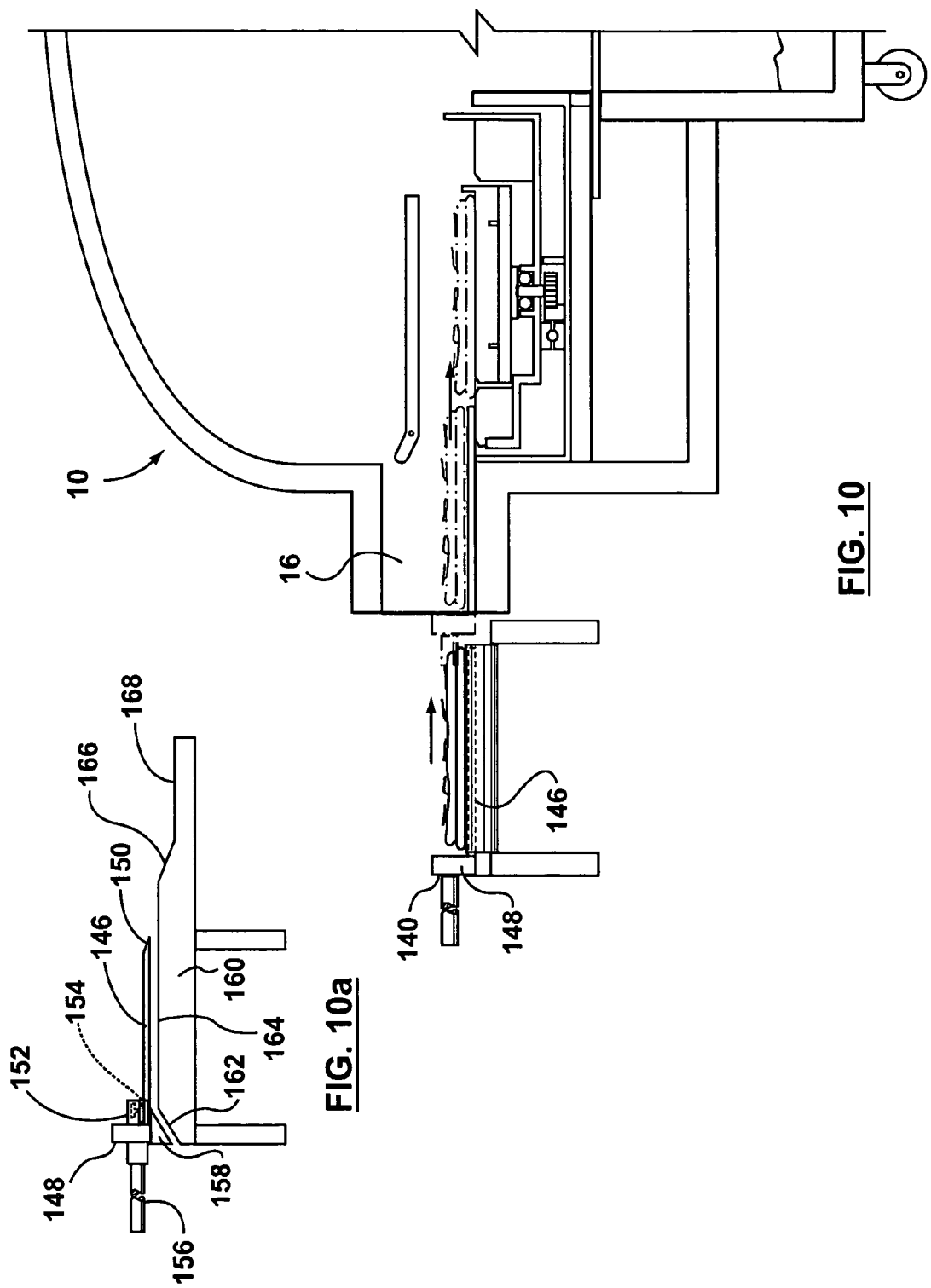

OVEN WITH ROTATING DECK AND CONTROL SYSTEM FOR SAME

FIELD OF THE INVENTION

The present invention relates to ovens, and more particularly to ovens having rotating platforms or decks, and to a control system for such ovens.

BACKGROUND OF THE INVENTION

When cooking certain types of food in an oven, it is often desirable to ensure that all sides of the food item are equally exposed to the heat source within the oven. To this end, a rotating platform may be used within the oven, with the platform having smaller pallets thereon that rotate relative to the platform. Such an oven is described in U.S. Pat. No. 1,163,807 to Bower et al.

Such ovens are subject to drawbacks. For example, when inserting food items into such an oven, the food item may be pushed too far into the oven, causing the food item to fall off the pallet as it rotates, possibly ruining the food item.

In addition, it is often desired to simultaneously cook different types of food items having different cooking times, the operator of such an oven will have to remember which food items have been placed on which food pallets, as well as their associated cooking times. This can be confusing, and may lead to undercooking or overcooking of food items. While in a factory setting, large quantities of items of the same recipe are cooked simultaneously, in a restaurant situation it is usually necessary to have the ability to cook a variety of different recipes, each requiring a different cooking time, and often requiring different cooking conditions.

For pizzas, there are a variety of known ovens. It is well-known that the general public considers a pizza cooked in a wood fired oven directly on a stone deck or surface as a superior product. Not only is the product better, the ambiance such an oven produces is associated with an upscale image and is therefore commercially important in its own right. However, because of the inherent labor costs and production limitations of this type of oven, no fast food operator has yet been able to offer such a product.

Standard wood-burning ovens have major differences in temperature thru-out the oven, partly as a result of the fire being built off to one side, and partly as a result of the front opening, and partly because a wood fire does not burn at a set uniform temperature. As a result, it takes a highly skilled operator to keep turning the pizzas as they are baking, as well as shifting them to different parts of the oven depending on size, amount of toppings, the degree of topping moisture and thickness of crust. Indeed, patents have been issued for pizza peels that allow the operator to partially rotate the pizza without removal from the oven to help in the constant turning. In the event several pizzas are being baked at one time, the job becomes much more complicated and the results are often an improperly cooked product as well as high labor cost. With the advent of high-speed rotary decks, ovens such as described, for example, in U.S. Pat. Nos. 6,146,677 and 6,250,210, a pizza can be cooked in 90 seconds but does require turning the pizza during that time interval. Without an automatic means of control, multiple cooking of pizzas or other food items with varying recipes in a "restaurant mode" is virtually impossible.

A wood burning pizza oven has a stone floor, and the pizza is placed directly on the floor, resulting in direct cooking of the crust or shell of the pizza, which is one feature that gives superior cooking. It is to be appreciated that, in a raw pizza, a large proportion of the weight is water, and indeed, for the ingredients or toppings, water can comprise 90 percent of the weight and may comprise 50 percent of the weight of the shell. As is known, browning of the shell, or even desired portions of the toppings, cannot occur until relevant portions have been cooked for long enough to drive off all the moisture, so that the temperature can then be raised above the boiling point of water, namely 100° C.

In such a wood burning oven, the bottom of the shell is immediately brought into contact with the hot floor of the oven, which results in rapid and even heating and cooking of the shell. The porosity of the floor also helps to dissipate water vapor given off from the shell, resulting in desirable, uniform browning and cooking of the bottom of the shell.

However, such a traditional oven requires considerable skill to operate and each individual pizza requires a large amount of attention, resulting in high staffing requirements. Typically, the temperature within such an oven is not uniform. Each pizza is placed in the oven, and then has to be continually monitored and moved within the oven, so that it is cooked uniformly. Sometimes, the top will not cook or brown at the same rate as the shell. A skilled pizza chef will often raise a pizza that is almost cooked on a pizza peel and hold it close to the roof of the oven, so that radiant heat from the roof will finish the browning process for the top of the pizza. Clearly, all of this requires a skilled pizza chef and is time consuming.

An alternative approach to cooking pizzas, commonly used in larger restaurants and where high volume is a premium, e.g. in restaurants specializing in take out or delivery of pizzas, requires different types of ovens and techniques. It is common to place each pizza on a tray or screen that is perforated. Here, it should be borne in mind that a raw pizza is a difficult object to manipulate, as the raw dough is flexible and has no rigidity. Thus, by forming pizzas on such a tray, handling of the pizzas is greatly facilitated and can be done by unskilled personnel. An additional advantage is that one can provide trays of different sizes corresponding to different pizza sizes, thereby giving automatic portion or pizza size control.

After each pizza has been assembled on a tray of appropriate size, the pizza and the tray are placed in an oven, until the pizza is cooked. This is often done, even where the oven itself has a proper, flat deck and is intended for traditional cooking of pizzas. In large establishments, pizzas are often delivered to and from the oven on conveyors that pass through the oven, and in this case, it is almost always necessary to retain the pizza on a tray. Such conveyor systems subject each pizza to the same cooking time and conditions, and provide no flexibility in terms of enabling selection of different cooking times, conditions, etc.

Additional advantages of using such trays are handling and storage of the pizzas both before and after cooking of them. The pizzas on the trays can be stacked on shelves.

However, cooking a pizza on a tray or screen, even if perforated, can never simulate the cooking characteristics of a traditional pizza oven where the pizza is cooked directly on the hot deck of the oven. Heating of the bottom of the pizza is indirect, and the tray or screen necessarily interferes with dissipation of moisture from the bottom of the pizza. Hence, browning of the bottom of the shell is quite different.

SUMMARY OF THE PRESENT INVENTION

Accordingly, the present invention is to provide an oven and cooking method that provide all the advantages and charm of an "old world" wood burning brick or stone oven, but can accommodate a random recipe environment (e.g. restaurant conditions), including the high speeds necessary for customer service, the high product rates necessary per square foot of space required, the low standard minute labor input needed for cost control, and the ability to do all of this with relatively unskilled operators.

The general construction of a conventional wood fired oven requires the fire to be built somewhere along the outer perimeter of the deck. If the fire were in the middle, it would greatly limit the number of pizzas that could be cooked at one time, since the back of the oven would be inaccessible.

The present inventor has realized that these limitations can be overcome by providing a central wood fire pit together with a removable ash collection drum directly below and revolving about the central wood fire pit. Above the ash collection drum and below the central wood fire grate, a stationary gas burning unit can be installed. Although this arrangement deals with many of the disadvantages of a conventional oven, the outer and inner edges of the deck and hence food items, such as pizzas, on it would still be subject to different temperatures and hence different cooking rates.

A further aspect of the present invention provides pallets, of stone or other suitable material, that would themselves rotate around bearing points in the rotating main deck. This would allow uniform cooking of each pizza, or other food item, over the area of the pizza. To retain the look of a classic "old world" oven as well as to facilitate pizza peel operation, oven cleaning, and oven repair, the pallets are set flush with the deck. The pallets and/or stone inserts for the pallets and the refractory inserts for the main deck are preferably removable and replaceable.

A further aspect of the present invention provides IR panels, preferably electric but other power sources can be used, that are pivotal or otherwise movable between an operational position directed at a food item and a non-operational position not directed at the food item. In order for the searing effect to be instantaneous when flipped down, the IR panels are on at all times. The heat output of each panel is designed to be such that when on at all times, they would contribute a predetermined percentage of heat to the oven.

For example, about 50% of the heat would be from the wood fire, 25% of the heat from the IR panels that would be constantly on, and the remaining 25% from the central fire pit heaters below the wood fire box. The central heater would be variable in order to control the overall oven temperature at a pre-set level by balancing the normal variations of the heat output of a wood fire as well as differences in oven loading. It will be understood that all these percentages can be varied depending on a particular application.

By using a relatively high rotating deck speed, the pizzas could be entered in a random manner and the deck stopped, with the pizza directly opposite the oven opening at the proper completion time (within e.g. 6 seconds if the deck were to operate at 10 rpm.)

The present invention can also include an automatic means of introducing and ejecting the pizza as well as signaling the oven as to the recipe required. Two control systems are disclosed, one computer controlled and one electromechanical for a cheap easily operated backup.

Accordingly, the present inventor realizes it is desirable to retain the best characteristics of traditional pizza ovens where a pizza is cooked directly on the deck of the oven, and more particularly characteristics of traditional wood burning pizza ovens, while at the same time reducing the skill level required and enabling a high throughput of pizzas. It is further desirable that such a technique should enable a variety of different pizzas, or even other food products to be cooked at the same time in the oven, for different time periods where required, again without requiring a high level of skill by the operator.

In one aspect, the present invention is directed to an oven. The oven has a housing defining an interior space, with an access aperture defined in the housing, and a heat source for providing heat within the housing. A substantially horizontal main platform is rotatably mounted within the housing, and a plurality of substantially horizontal pallets are rotatably mounted to the main platform. Each pallet has a stopping member. The oven also has a source of motive power and a transmission system. The transmission system operatively couples the source of motive power to the main platform to drive the main platform to revolve within the housing, and the transmission system further operatively couples the source of motive power to the pallets to drive the pallets to rotate relative to the main platform. The transmission system constrains rotational movement of the pallets relative to the main platform to cause each pallet to be oriented with its stopping member positioned opposite the access aperture whenever that pallet is aligned with the access aperture.

Preferably, the transmission system constrains the number of revolutions made by each pallet during a single revolution of the main platform to a whole number. Also preferably, the source of motive power is a motor, and the transmission system includes a gear wheel coupled to the motor so as to be drivable by the motor, and a gear surface defined on a perimeter surface of the main platform. The gear wheel meshes with the gear surface on the perimeter surface of the main platform. The transmission system also includes a fixed gear track forming a closed loop within the housing and a plurality of driving gears, each driving gear being drivingly coupled to an associated pallet and meshing with the gear track. Upon revolution of the main platform within the housing, engagement of the driving gears with the gear track causes the driving gears to rotate, and rotation of the driving gears causes the pallets to rotate relative to the main platform.

In one particular example, the pallets each have a curved perimeter surface, and the driving gears associated with each pallet are rigidly annularly disposed on the perimeter surfaces of their associated pallets.

In another particular example, the pallets are each fixedly mounted to a shaft that is rotatably mounted to the main platform, and the driving gear associated with each pallet is rigidly annularly disposed on the shaft.

The driving gears and the gear track each have gear surfaces that cooperate to control the rotational position of each pallet to cause the stopping member of each pallet to be positioned opposite the access aperture whenever that pallet is aligned with the access aperture. The size and number of teeth on each of the driving gears and on the gear track is selected to constrain the number of revolutions made by each pallet during a single revolution of the main platform to a whole number.

A further aspect of the present invention provides an oven, comprising:

a housing defining an interior space, the housing having an access aperture;

a heat source for providing heat within the housing;

a substantially horizontal main deck, the main deck being rotatably mounted within the housing;

a plurality of substantially horizontal pallets, the pallets being rotatably mounted relative to the main deck; and a drive source for rotating the main deck and the plurality of pallets; wherein the pallets are substantially flush with the main deck.

In another aspect, the present invention is also directed towards an oven. The oven has a housing defining an interior space, with an access aperture defined in the housing, and a heat source for providing heat within the housing. A substantially horizontal main platform is rotatably mounted within the housing, and has a plurality of cooking positions disposed thereon. A source of motive power is coupled to the main platform to drive the main platform to revolve within the housing. The oven includes a controller operatively coupled to the source of motive power and operable to activate and deactivate the source of motive power, and a memory operatively coupled to the controller for storing data corresponding to food items and cooking times, with each food item being correlated with an associated cooking time. The oven also includes a plurality of indicators, each indicator being associated with one of the cooking positions. Each indicator is operatively coupled to the controller and is operable to transmit an indicator signal to the controller indicative of whether its associated cooking position is occupied or vacant. The oven further includes a selector operatively coupled to the controller and operable to transmit a first cooking signal and a second cooking signal to the controller. At least one of the first cooking signal and the second cooking signal corresponds to a selected food item. Upon receiving the first cooking signal from the selector, the controller will use indicator signals from the plurality of indicators to identify a vacant cooking position and deactivate the source of motive power when the vacant cooking position is aligned with the access aperture. Upon receiving the cooking signal that corresponds to the selected food item from the selector, the controller retrieves a cooking time associated with the selected food item from the memory. Upon receiving the second cooking signal from the selector, the controller activates the source of motive power to cause the main platform to rotate for a time substantially equal to the cooking time and then deactivates the source of motive power to cause the main platform to stop rotating when the vacant cooking position is aligned with the access aperture.

In one particular example, each cooking position is a pallet rotatably mounted to the main platform, and each pallet is driven to rotate relative to the main platform. The oven also includes a transmission system operatively coupling the source of motive power to the main platform to drive the main platform to revolve within the housing. The transmission system also operatively couples the source of motive power to the pallets to drive the pallets to rotate relative to the main platform. Preferably, the transmission system constrains rotational movement of the pallets relative to the main platform to cause each pallet to be oriented with its stopping member positioned opposite the access aperture whenever that pallet is aligned with the access aperture. The transmission system constrains the number of revolutions made by each pallet during a single revolution of the main platform to a whole number.

A further aspect of the present invention provides an oven comprising:
  a heated cooking enclosure;
  a rotating deck within the enclosure for receiving food items;
  an access aperture for transfer of food items between the exterior and the interior of the enclosure; and
  a conveyor adjacent the access aperture, for transfer of food items from the conveyor into and out of the enclosure.

A further aspect of the present invention provides a multi-pronged peel for moving food items from a roller conveyor to another location, the multi-pronged peel having a rear cross member and a plurality of prongs extending from the rear cross member, wherein each prong is dimensioned to fit between a pair of rollers with a top surface of the respective prong below top surfaces of the rollers.

The present invention also provides a peel and transfer sheet combination for facilitating handling of food items, the combination comprising a peel having first engagement means, a transfer sheet having second engagement means for engagement with the first engagement means to retain the transfer sheet on the peel; and an actuation member mounted on one of the peel and the transfer sheet, for enabling engagement and disengagement of the first and second engagement means.

Another aspect of the present invention provides a method of cooking food items, the method comprising:
  (1) providing a rotating deck on which food items are located, placing food items on the deck and rotating the deck to cause the food items to follow a generally circular path;
  (2) providing heat within the oven to cook the food items;
  (3) providing at, at least one location within the oven, a radiant heat source movable between a first position directed towards a food item on the deck and a second position not directed towards a food item; and
  (4) as each food item passes by the radiant heater and as required, moving the radiant heater to the first position to promote cooking of the top surface of the food item, and when the top surface of the food item is either sufficiently cooked or is past the radiant heater, moving the radiant heater to the second position. The two positions could be the result of the heater moving as described in the drawings, or having the heaters stationary and providing them with reflectors that move in synch with the deck rotation. In the latter case, the reflectors would reflect radiation downward to the food or 180 degrees away from the food, depending on whether in the first position or the second position. In all cases the IR heater would be always on for instant heating.

Another method aspect of the present invention provides supplying food items to an oven, the method comprising:
  (1) providing an oven including an access aperture;
  (2) providing a conveyor extending past the access aperture and having a transfer section adjacent the access aperture; and
  (3) providing a peel mechanism including a peel for sliding under food items on the conveyor, moving food items through the access aperture into the oven, and for withdrawing cooked food items from the oven out through the access aperture and placing food items on the conveyor;
  (4) delivering food items on the conveyor to the transfer section;
  (5) transferring a food item from the transfer section into the oven through the access aperture with the peel mechanism;
  (6) cooking each food item for a desired time; and
  (7) at the end of the cooking time, removing the food item from the oven with the peel mechanism and placing the food item on the conveyor.

In yet another aspect, the present invention is directed to a method of operating an oven having a housing that includes an access aperture, a main platform rotatably mounted within the housing and having a plurality of cooking positions, and a source of motive power coupled to the main platform and operable to drive the main platform to rotate within the housing. The method includes the steps of (a) checking for a signal indicating that a food item is to be inserted into the oven, and (b) upon receipt of the signal in step (a), identifying a vacant cooking position and (c) deactivating the source of motive power when the vacant cooking position is aligned with the access aperture. The next step in the method is (d) checking for a signal that the food item has been inserted into the oven. At least one of the signal in step (a) and the signal in step (d) is indicative of a selected food item. The method next includes the steps of (e) retrieving a cooking time corresponding to the selected food item, (f) activating the source of motive power and, (g) when the cooking time retrieved in step (e) has substantially elapsed, deactivating the source of motive power when the cooking position identified in step (b) is aligned with the access aperture. All steps except step (e) are carried out in order, and step (e) is carried out after step (a) and before step (g). Step (e) is only carried out before step (d) if the signal in step (a) is indicative of a selected food item.

In a particular example, step (g) includes checking whether the cooking time retrieved in step (e) has completely elapsed.

In another particular example, step (g) includes the substeps of, in order, checking whether the selected pallet is aligned with the access aperture, checking whether the difference between the elapsed time and the cooking time retrieved in step (e) is less than a specified amount, and if the difference is less than the specified amount, deactivating the source of motive power. Preferably, the specified amount is an amount of time taken by the main platform to make one complete revolution.

BRIEF DESCRIPTION OF THE DRAWINGS

For a better understanding of the present invention and to show more clearly how it may be carried into effect, reference will now be made, by way of example, to the accompanying drawings, in which:

FIG. 1 is a side view of an exterior of an oven according to an aspect of the present invention;

FIG. 2 is a top view of the exterior of the oven of FIG. 1;

FIG. 4a is a plan view of the transmission system of FIG. 3a.

FIG. 10 is a vertical sectional view showing the conveyor roller unit and part of the oven;

FIG. 10a is a detailed view, on a larger scale, of a cam mechanism of the conveyor roller unit of FIGS. 7-10;

DETAILED DESCRIPTION OF THE INVENTION

Figure 3A:
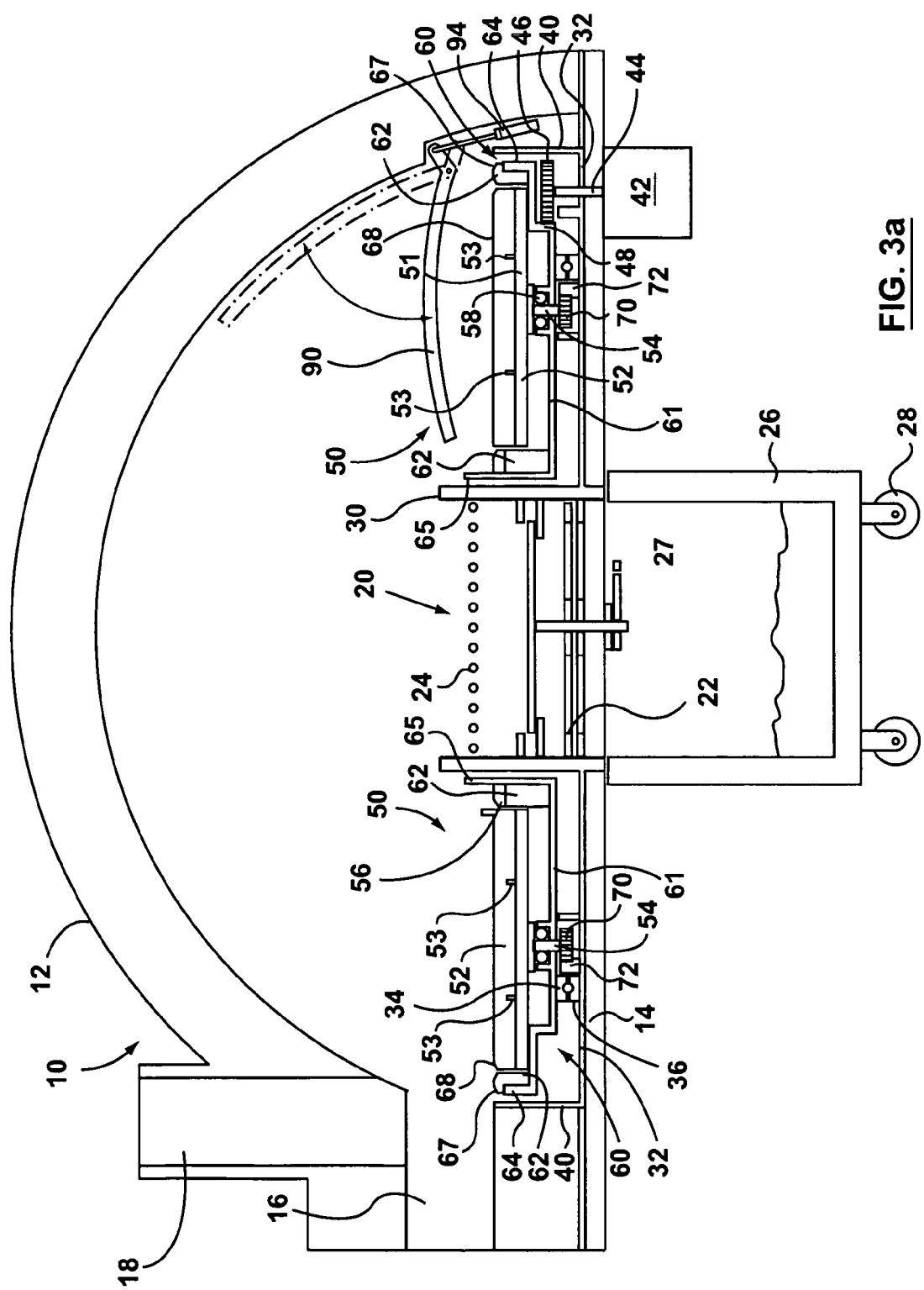
FIG. 3a is a cross sectional view showing the transmission system of a first example of the oven of FIG. 1, taken along the line 3-3 in FIG. 2.

Examples of ovens made according to the present invention will now be described.

General Description of an Example of an Oven having a Revolving Platform

Now referring to FIGS. 1 and 2, an oven in accordance with an aspect of the present invention is shown generally at 10. The oven 10 comprises a main housing 12 defining an interior volume. The housing 12 is supported by a base 14, and has an access aperture 16 for accessing the internal volume. Food items to be cooked, for example pizzas, may be placed into the oven 10 through the access aperture 16. If desired, the access aperture 16 may be provided with a closable door (not shown) to inhibit the escape of heated air from the oven 10. Additionally, a vent 18 is provided for venting gases from within the housing 12 of the oven 10. The location of the vent or chimney 18 can be varied.

Figure 3B:
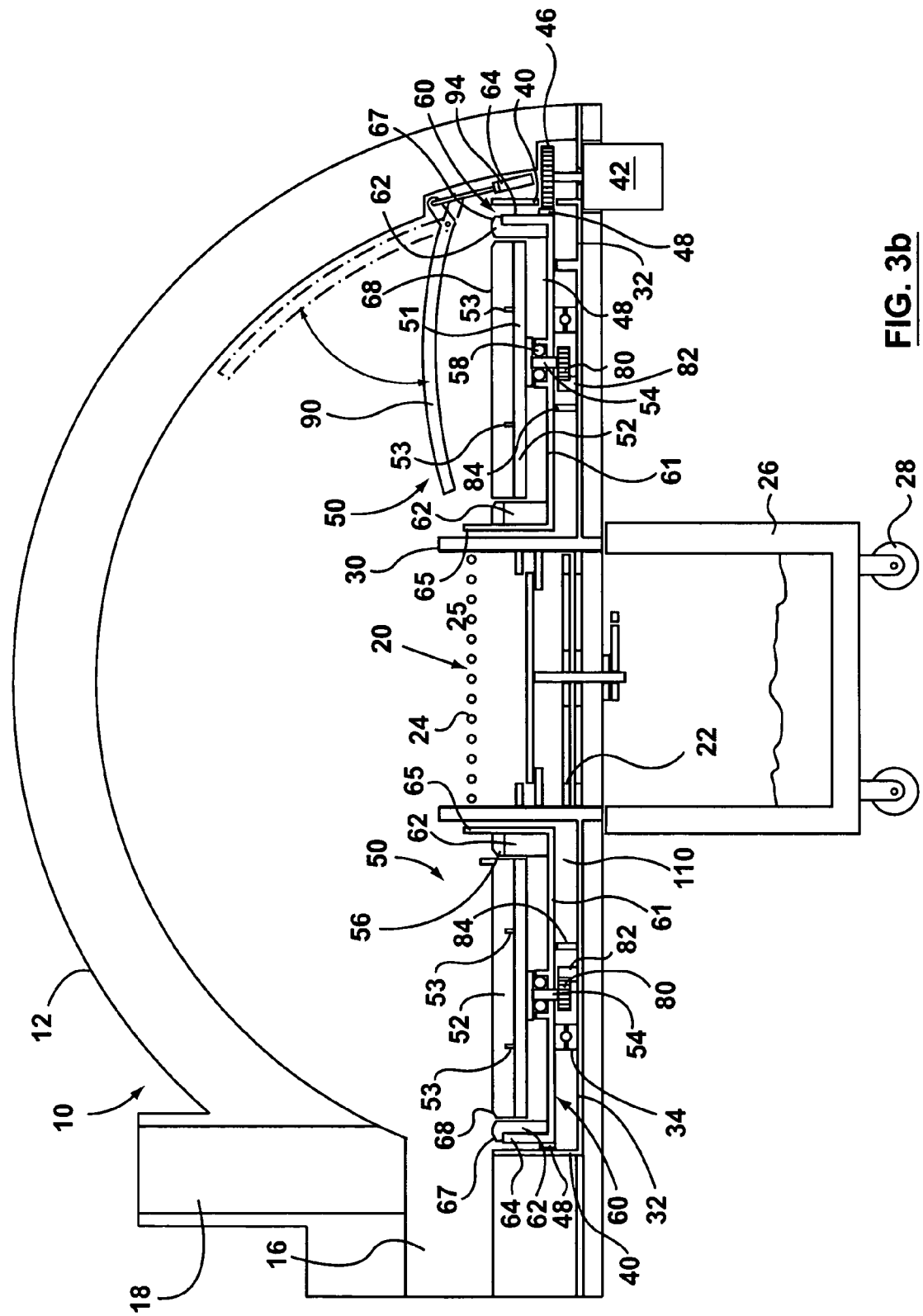
FIG. 3b is a cross sectional view showing the transmission system of a second example of the oven of FIG. 1, taken along the line 3-3 in FIG. 2.

Now referring to FIGS. 3a and 3b, two examples of transmission systems within an oven 10 according to an aspect of the present invention are shown in cross section. These two example transmission systems have many features in common, and will therefore initially be described together with reference to both FIGS. 3a and 3b, with the same reference numbers being used to refer to the common features. After the common features have been described, the specific features of each example will then be described separately in more detail.

A heat source 20 is disposed within the oven 10. As seen in FIGS. 3a and 3b, the heat source 20 is preferably centrally disposed within the housing 12. Also preferably, the heat source 20 comprises a firebox having a grating 24 and a gas heater 25. A rolling ash pit 26 is positioned beneath the grating and gas heater 24. The grating 24 and gas heater 25 can alternatively be integral, with at least some of the bars of the grating being hollow gas supply bars with gas jets. A vertically extending circular sidewall 30 confines the burning contents of the firebox. A rotary ash plate 22 is turned for ash removal. Thus, the oven 10 is preferably a wood-burning oven 10 with gas heat support. Also preferably, the rolling ash pit 26 is provided with water-cooled central ash disposal. The ash pit 26 is provided separately below the grating and gas heater 24 and is provided with wheels 28, so that it can readily be rolled away for emptying.

A rotatable ash plate 22 is mounted above the center of the main platform 32, with the plate 22 and the platform 32 including corresponding openings. In one position of the plate 22, these openings are aligned to promote ash to drop through; in another, closed position of the plate 22, the plate 22 closes off the openings in the platform 32. The ash plate 22 is mounted on a tubular actuation shaft 27, that extends through the platform 32 and is connected to an actuation lever, which in turn extends to a location for ready actuation. The supply pipe for the heater 25 extends centrally and coaxially within the tubular actuation shaft 27.

The grating and gas heater 24, while shown schematically, can alternatively comprise, at least in part, a circular burner bar running around the outer wall, with gas jets (not shown) facing the center, so that the ashes falling from the wood fire do not clog the jets.

The provision of a central ash disposal unit 26 makes the oven 10 easier to clean, reduces down time, and saves time and labor. A controllable flue can be provided below the firebox to aid in wood fire temperature control as well as control the rate of wood consumption.

Although the oven 10 has been described with reference to a wood burning central heat source 20, one skilled in the art will recognize that the heat source 20 may be any heat source suitable for oven cooking. It will further be recognized that while the heat source 20 is preferably centrally disposed within the housing 12, such central positioning is not strictly necessary to the present invention. For example, conventional electrical elements, heat lamps or heat vents disposed above a cooking region may be used either in addition to or as an alternative to the central heat source 20. Preferably, infrared and halogen overhead cooking lamps (not shown) are used to supplement a wood burning central heat source 20. Also preferably, the oven 10 is operated at high temperatures.

Figure 3C:
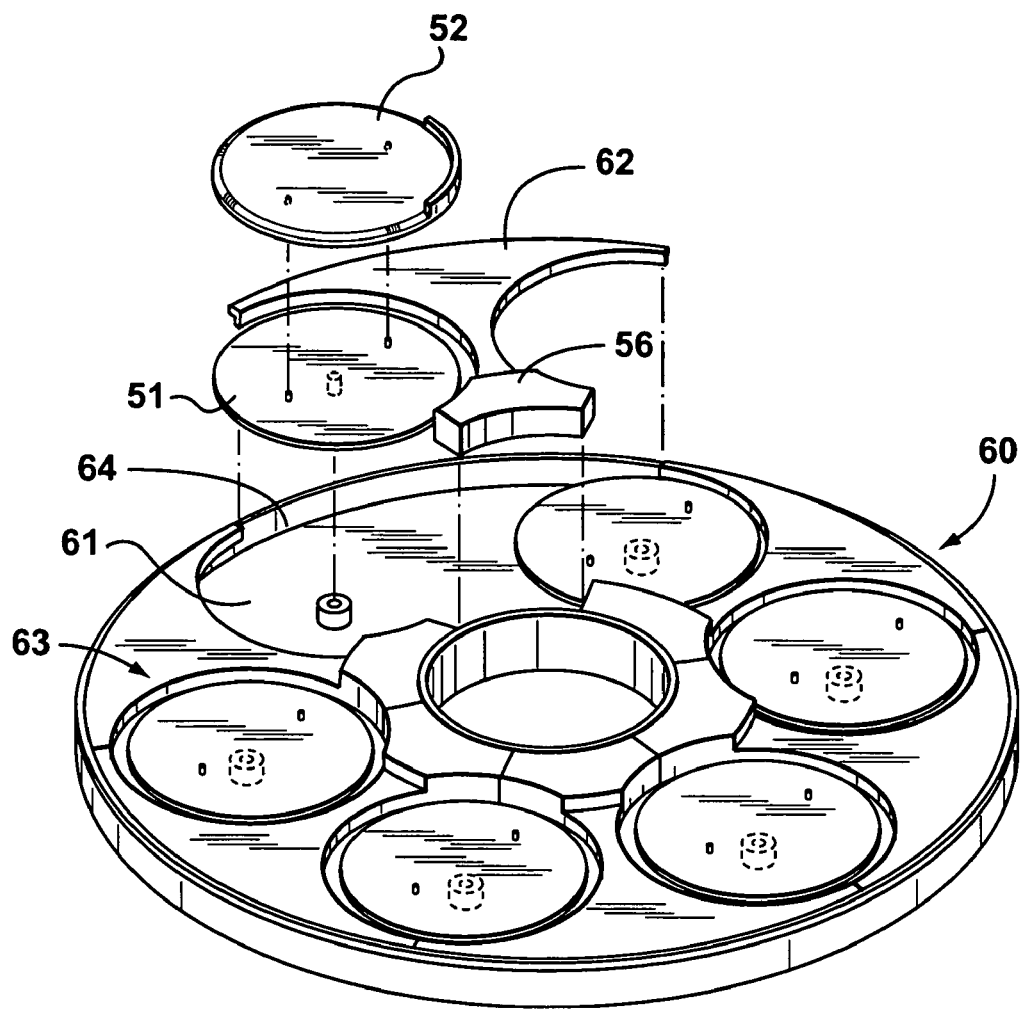
FIG. 3c is an isometric view showing an exploded detail of a main deck.
Figure 3D:
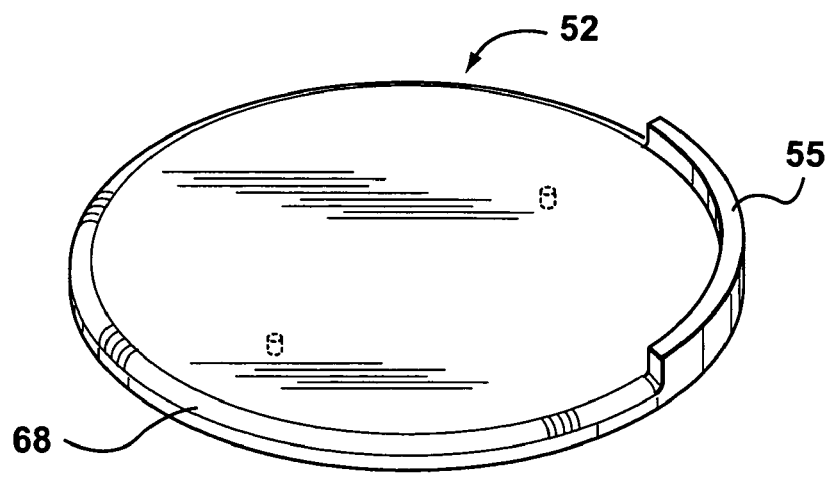
FIG. 3d is an isometric view of one pallet of the oven of FIGS. 3a, b and c.
Figure 4A:
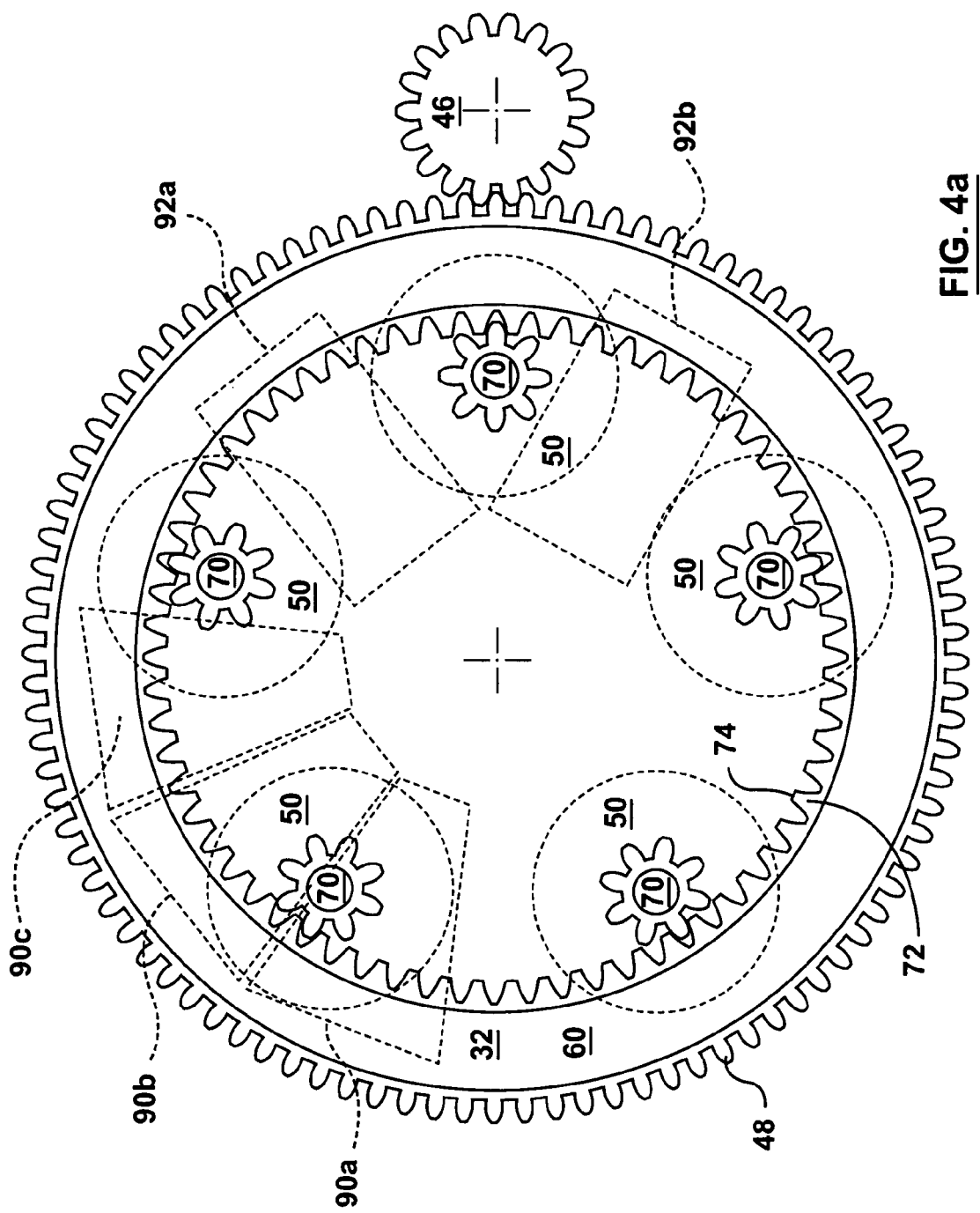

Two exemplary arrangements of overhead cooking lamps are shown for the embodiment of FIGS. 3 and 4, being shown in detail in just FIGS. 3a, 3b and 4a. A first arrangement of lamps is indicated by the reference 90, as lamps or heating elements 90a, 90b, 90c. Each of these elements 90a, b and c is generally tapered or wedge-shaped, so as to provide effective coverage around the track taken by the individual pallets 50 (detailed below). Each of these elements 90 can be any suitable cooking element, including halogen or infrared cooking lamps. They are preferably operable independently and preferably each is capable of being set to different power or heat levels.

As it takes some time for such radiant heat sources to reach a maximum and uniform temperature, they are kept continuously on. Their heating effect is controlled by pivoting them or their reflectors out of the way. The heating elements 90 can be pivoted between a horizontal, operative position uniformly spaced above the pallets 50 and directed at food items on the pallets 50, and a vertical, inoperative position spaced away from the pallets 50 and not directed at food items. In either position, they will continue to contribute to the heat in the oven 10. In a variant (not shown) reflectors are provided that can be pivoted between a first position above the IR units reflecting radiation down onto the food items, and a second position, rotated 180 degrees from the first position and below the IR units to reflect heat up and away from the food items. The reflectors would be rotated between the two positions to give the desired amount of cooking, and can either be rotated to the second position when a food item has been sufficiently cooked or when the food item has passed the IR unit(s). The IR units would then always be in a fixed down position, preferably in the rear of the oven.

For this purpose, a solenoid or other actuator 94 with a suitable connection mechanism is provided for each heating element 90.

Electric heating elements are preferred, as it is believed that flexible supply lines will readily accommodate the pivoting action. However, gas-fired heating elements could be used instead.

FIG. 4a also shows an alternative arrangement, where simple rectangular elements 92a, 92b are provided. As shown in FIG. 4a, with such an arrangement it is not possible to achieve complete coverage of the entire path taken by the pallets 50. For some applications, this may be suitable, and this enables simpler rectangular heating elements to be used, which can be of standard design, rather than having to provide tapered heating elements 90a, b and c, which would almost certainly need to be custom designed. Again, solenoids or actuators 94 are provided to move the heating elements 92 between operative and inoperative positions. In all variants, the vent 18 would be located or configured so as not to be blocked by the elements 90 or 92, e.g. by locating it in the lower left quadrant as viewed in FIG. 4a.

The dome or main housing 12 is relatively thick and formed of refractory material. As such it can be cut away to provide recesses to accommodate the heating elements 90, 92, and these heating elements can be shaped so as to fit flush within these recesses.

A substantially horizontal main deck 60 is rotatably mounted within the housing 12, above a main platform 32. In the example shown, the main deck 60 is annular and is configured to revolve around the heat source 20. The main deck 60 is supported and located by a bearing 34 having a circular track 36 on the main platform 32, and surrounding the heat source 20. The bearing 34 is preferably a stewing bearing, and can simply comprise a sufficient number of individual rollers. Integral with the bearing 34, or provided separately, there is an annular dust and dirt shield 38. One skilled in the art will appreciate that, depending on the size and weight of the main deck 60, additional tracks and bearings (not shown) may be placed at other locations to provide further support for the main deck 60.

The main platform 32 is joined to the side wall 30 and also to an outer side wall 40. The main platform 32 and its side walls 30, 40 are preferably formed from steel.

Below the main platform 32, there is a layer of insulation 110. This arrangement of a main platform 32 bearing the essential elements of invention enables it to be used either in an oven specifically intended for the present invention or in a conventional oven to retrofit the oven. In the later case, the original deck of the wood burning oven would provide the insulation needed.

The outer wall 40 preferably serves to mount the heating lamps 90 or 92 and their actuating solenoids 94. It also serves to prevent warping of the main platform 32 due to temperature effects.

At least for an oven specifically intended to implement the present invention, the main housing 12 is adapted to be lowered and fitted onto the main platform 32, with the outer wall 40 serving to locate the main housing 12.

The main platform 32, main deck 60 and other components are formed from similar materials so as to have the same coefficient at expansion, so that expansion at temperatures in the oven (for example above 500° F.) does not generate unwanted stresses. Various refractory components are used to form the cooking surface. The refractory, steel and other components are dimensioned to accommodate differences in expansion characteristics.

A source of motive power is coupled to the main deck 60 to drive the main deck 60 to revolve within the housing 12. Preferably, the source of motive power is a motor 42. In some instances, the motor 42 is preferably capable of functioning as a stepper motor. A stepper motor has the additional advantage that the position of the motor can be used to determine accurately the position of the pallets 50.

The motor 42 has a drive shaft 44 terminating in a gear wheel 46. In the examples shown in FIGS. 3a and 3b, the main deck 60 has an upwardly extending annular flange 48 having gear teeth defined on its outer surface (all the gear teeth are shown schematically in the figures). For simplicity and economy, the gear teeth can be defined simply by welding or otherwise attaching a chain to the annular flange 48. The gear teeth on the annular flange 48 mesh with gear teeth on the gear wheel 46 so that when the motor 42 drives the gear wheel 46 to rotate; the gear wheel 46 will in turn drive the main deck 60 to revolve within the housing 12. One skilled in the art will appreciate that gear teeth may be disposed on the outer circumferential surface of the main deck 60 even in the absence of an annular flange 48, so long as the main deck 60 has sufficient thickness. One skilled in the art will of course appreciate that other suitable means for driving the main deck 60 to rotate within the housing 12 may also be used.

As shown the annular flange 48 is inset from the outer edge of the main deck 60, to enable the deck 60 to extend to the edge of the oven 10. For some applications it may be possible and desirable to place the annular flange 48 at the edge of the main deck 60.

The gear wheel 46 and the toothed annular flange 48 on the main deck 60 form part of a transmission system suitable for the oven 10. Other aspects of two particular examples of suitable transmission systems will be discussed further below.

A number of pallets 50 are rotatably mounted to the main deck 60. Preferably, the pallets 50 each comprise a pallet base or support plate 51 and a self-cleaning cooking member 52 supported by the support plate 51, and formed from stone or a refractory material. The cooking member 52 defines a stone cooking surface for cooking food items. The pallets 50 may each have a lip 55 for preventing food being loaded onto the cooking member 52 from being pushed too far and falling off the cooking surface and onto the main deck 60.

Each pallet base or support plate 51 has pins 53 that locate and help to secure a respective cooking member or stone 52 in position. Preferably, the support plates 51 and pins 53 are formed from steel. The cooking members or stones 52 include recesses corresponding to the pins 53.

The pallets 50 are located in a main deck 60 that forms a floor of the oven 10. The main deck 60 is constructed similarly to the pallets 50. Thus, the main deck 60 has a deck base 61 and deck lining members 62 on top of the deck base 61 and forming an upper surface of the main deck 60. As shown in FIG. 3c, there are preferably a number of deck lining members 62, shaped conveniently to take into account temperature variations in the oven, and known problems of expansion and contraction. The deck lining members 62 are preformed from a refractory material. The deck lining members 62 of the main deck 60 form a circular opening 63 for each of the pallets 50. The deck lining members 62 are shaped to fit around these openings 63, and preferably, are shaped to avoid any odd profiles for each of the deck lining members 62. The top surfaces of the deck lining members 62 and each stone 52 are generally flat and coplanar, except for any rounded or tapered edges.

The deck base 61 includes an outer flange 64 around the circular exterior of the main deck 60, so as to locate the deck lining members 62 in position.

On a radially inner edge of the main deck 60, there is an inner flange 65 that can extend above the height of the deck lining members 62, so as to prevent food items from being inserted too far or pushed beyond the inner edge of the main deck 60. To provide a true stopping member 56, a flange or stopping member 56 can be mounted coaxial with the axis of main deck 60, and located immediately behind each pallet 50. This can either be formed as a stopping member integral with the deck lining members 62 or as a flange connected to the flange 65. When formed as part of the lining members 62, these would not then be generally flat, etc., as indicated above. In either case, the stopping member 56 would include arcuate portions corresponding to the shape of the circular openings for the pallets 50.

The pallet support plate 51 and the deck base 61 are conveniently formed from steel to accommodate manufacturing of lips and flanges. As desired, pins or additional fastening members can be provided for securing the deck lining members 62 to the deck base 61, and also for securing the cooking members 52 to the pallet support plates 51.

However, it is preferred for each stone or cooking member 52 to be provided with a stop, shaped as a lip 55 extending around part of the circumference of the stone. Such a stop can extend through an angle in the range 30-60°, and has the advantage that it is curved to correspond to the shape of a pizza, so as to assist in accurately locating each pizza on its respective stone 52. As the individual pallets are gear driven and the ratio is a whole number, as detailed below, lips 55 on the pallets 50 will always be located in a correct radially inner position at the aperture 16.

As detailed below, a novel peel in accordance with the present invention is provided, to facilitate insertion and removal of pizzas from the oven, and onto and off the individual pallets 50. To ensure that the end of this peel does not tend to snag or catch on any exposed edges, edges of the deck lining members 62 and of the individual cooking members or stones 52 can be rounded or tapered as generally indicated at 67 and 68 respectively, so that the edge of a peel can be, for example, placed on an outer portion of the deck lining member 62 and slid across it onto an adjacent pallet 50, with confidence that the peel will not tend to snag or catch the edge of the pallet 50. In this context, it will be appreciated that the edge surfaces indicated at 67, for the outer edge of the main deck 60, and 68, for the radially outer (with respect to the deck 60 as a whole) edge of each pallet 50, are the most important edges that need this rounding or tapering treatment. For each of the pallets 50, as these are geared and their positions are accurately known, it may not be necessary to provide a rounded or tapered surface around the entire exterior of each pallet 50. Where the gearing is such that, for each pallet 50, exactly the same portion of the pallet 50 will be facing outwards when the pallet 50 is adjacent the access aperture 16, then it may be sufficient just to provide a tapered edge around a portion of each pallet 50.

To mount each support plate 51 in the main deck 60, the main deck 60 includes an opening in which there is mounted a bearing member or collar 58. Each support plate 51 includes a downwardly depending shaft 54 that is rotatably mounted in a respective bearing member 58. The bearing member 58 provides a plain sleeve bearing or bushing, that should be robust enough for the large temperature variations in an oven. For some applications, it may be preferred to provide a ball or roller bearing. The bearing member 58 is secured by screws or other fasteners, passing through mounting apertures of the bearing member 58. Preferably, by means of elongated mounting apertures or otherwise, the mounting arrangement provides for radial adjustment of the position of the bearing member 58, so as to enable adjustment for wear and adjustment if a pallet 50 becomes jammed by food or other debris. Preferably the opening in the main deck 60 for each bearing member 58 is large enough to enable a pallet 50, including its drive shaft 54 and a drive gear 70 (detailed below) and associated bearing member 58 to be removed. This enables repairs to be made, and larger items of debris jamming the mechanism to be removed.

Description of a First Example of a Transmission System

Now referring specifically to FIGS. 3a and 4a, a first example of a transmission system suitable for use in an oven 10 according to an aspect of the present invention is shown. FIG. 4a shows a plan view of the first example of a transmission system, with the housing 12, base 14 and central heat source 20 removed for clarity.

In this first example, the shaft 54 of each support plate 51 terminates in a driving gear 70. An annular gear track 72 is fixedly secured to and extends upwardly from the main platform 32 of the oven 10, and again could comprise a chain. The gear track 72 is mounted on the radially inner side at the bearing 34 and could be integral with the bearing 34. The gear track 72 has an inwardly facing gear surface 74 and is positioned so that this inwardly facing gear surface 74 meshes with the driving gears 70. When the motor 42 rotates the gear wheel 46, thereby rotating the main deck 60, the pallets 50 will revolve along with the main deck 60. This movement of the pallets 50 will cause the driving gears 70 to move along the gear track 72 while the gear track 72 remains fixed. Because the driving gears 70 mesh with the gear surface 74 of the gear track 72, the driving gears 70 will rotate as they move along the gear track 72, thereby driving the pallets 50 to rotate relative to the main deck 60.

Description of a Second Example of a Transmission System

Figure 4B:
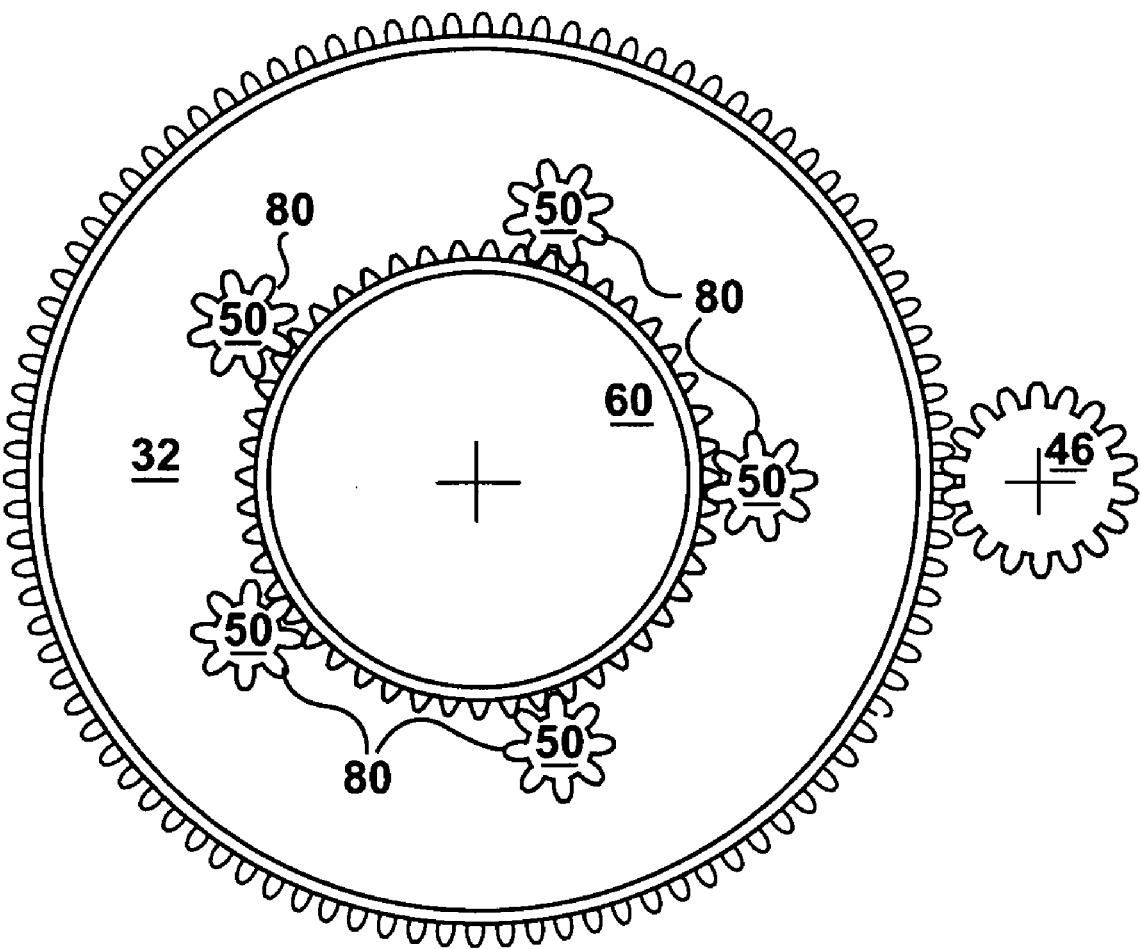
FIG. 4b is a plan view of the transmission system of FIG. 3b.

Now referring specifically to FIGS. 3b and 4b, a second example of a transmission system suitable for an oven 10 according to an aspect of the present invention is shown. FIG. 4b shows a plan view of the second example of the transmission system, with the housing 12, base 14 and central heat source 20 removed for clarity.

In this second example, the pallets 50 each have a driving gear 80 similar to the driving gear 70, but here shown larger; the size of the driving gears 70, 80 can be selected to give the desired number of complete revolutions for each pallet 50 for one complete revolution at the main deck 60. Additionally, a gear track 82, corresponding to the gear track 72, is shown radially inwardly, to cause rotation of the pallets 50 in the opposite direction. In general, the direction of rotation of the main deck 60 and each pallet 50 is arbitrary.

The annular gear track 82 can again be integral with the bearing 34, and a dust or dirt shield, here designated at 84. Annular track 82 is provided radially inside of both bearing 34 and driving gear 80 such that an outwardly facing gear surface 83 meshes with driving gear 80.

The motor 42 together with the shaft 44 and the gear wheel 46 are shown located outside of the main deck 60. Correspondingly, the annular flange 48 of the main deck 60 is now shown at the outer perimeter of the main deck 60, to show that various configurations are possible.

Operation of the embodiment of FIG. 3b is essentially the same as for FIG. 3a, with the exception that the pallets 50 will rotate in a different direction and at a different speed.

It will be understood that the gear sizes are shown schematically, especially in FIGS. 4a and 4b. In FIGS. 3a and 3b, the driving gears 70 are relatively small, while the corresponding gear surface 74 on the gear track 72 in FIG. 3b is much larger. It will be understood that such a difference in gear sizes will give a large rate of rotation of each pallet 50, and will dictate the number of rotations that each pallet 50 makes for a complete rotation of the main deck 60. Selection of the gear size and the number of rotations is largely a matter of choice and should be chosen so as to ensure uniform cooking of pizzas or other food products. Clearly also, both rotational speed of the main deck 60 and the individual pallets 50 should be sufficiently low that the motion does not affect the food products' adversity, e.g. by tending to throw off ingredients on the top surface of the pizza or other food product.

While the pallets 50 have been shown as individual pallets, it is generally preferred to have the pallets 50 generally flush within the deck 60, or some extension of the deck 60. This can facilitate placing the food items, such as pizzas, on the pallets 50, and further, should any food item be accidentally misplaced so that it is partially off or overhangs a pallet 50, then it will be supported by the surrounding portion of the main deck 60. Such a misplaced food item can then be readily moved or realigned, as desired. As detailed above, edge surfaces 68 are preferably tapered, to facilitate use of a peel.

Use of the Transmission Systems to Control Rotational Movement of the Pallets

It can thus be seen that it is possible to cause the pallets 50 to rotate while the main deck 60 revolves around the heat source 20, which remains stationary. The revolving main deck 60, and the rotation of the pallets 50 relative to the main deck 60, allows food items placed thereon to be evenly cooked on all sides and uniformly across the width of the food item.

The two examples described above by reference to FIGS. 3a, 3b, 4a and 4b are of course merely exemplary of the transmission systems by which the pallets 50 and main deck 60 can be made to rotate. One skilled in the art will realize that a wide variety of other transmission systems may also be used. Any suitable transmission system that is operatively coupled to the source of motive power, i.e. the motor 42, and to the main deck 60 to drive the main deck 60 to revolve within the housing, and further operatively coupled to the pallets 50 to drive the pallets 50 to rotate relative to the main deck 60, may be used.

According to a particular aspect of the present invention, the transmission system constrains rotational movement of the pallets 50 relative to the main deck 60. Specifically, rotational movement is constrained to cause each pallet 50 to be oriented with its lip 55 positioned opposite the access aperture 16 whenever that pallet 50 is aligned with the access aperture 16. This configuration is shown clearly in FIGS. 3a and 3b. In particular, the driving gears 70, 80 or support plates 51, and the gear tracks 72, 82 each have carefully selected sizes. The number and shape of teeth on the gears are also carefully selected. These features are selected so that the gear surfaces of the driving gears 70, 80 or support plates 51 and the gear tracks 72, 82, respectively, will cooperate to control the rotational position of each pallet. In particular, exact gearing is used to control the rotational motion so that the number of revolutions made by each pallet 50 during a single revolution of the main deck 60 is constrained to a whole number. In other words, for each complete revolution of the main deck 60, each pallet 50 will make some number of complete revolutions, but not any partial revolutions. For example, each pallet 50 could make two, three, four, or even ten or more revolutions on each complete revolution of the main deck 60, but would not make, for example, two and one half revolutions, or four and one third revolutions. This constraint to a whole number of revolutions means that after each complete revolution of the main deck 60, each pallet 50 will have returned to the rotational position it was in, relative to the main deck 60, prior to commencement of that revolution of the main deck 60. If each pallet 50 is initially placed in a rotational position where its lip 55 is positioned opposite the access aperture 16, then the constraint to a whole number of rotations means that the lip 55 of each pallet 50 will be positioned opposite the access aperture 16 whenever that pallet 50 is aligned with the access aperture 16.

Control Features to Enable Automatic Cooking

In another aspect of the present invention, the oven 10 may be provided with control features permitting the oven 10 to automatically cook different types of food items each having variable cook times, even when these items are introduced in a random order.

Each of the pallets 50 is considered to be a separate cooking surface for the purpose of the control system described below.

One skilled in the art will realize that the control system described below will function even if the pallets 50 are omitted and individual cooking surfaces are defined directly on the main deck 60. In such a case, of course, the benefits of rotating pallets 50 will not be obtained.

Figure 5:
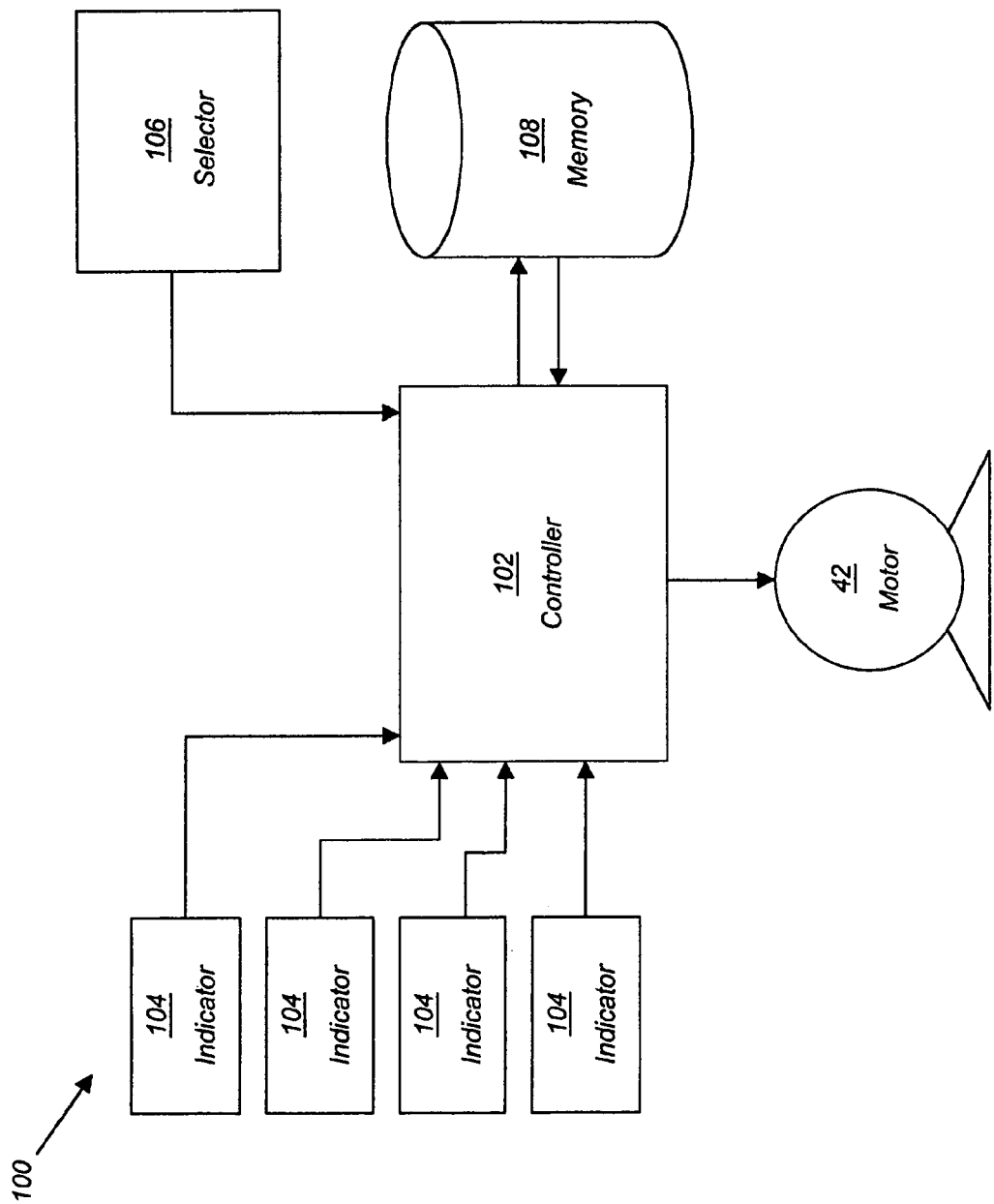
FIG. 5 is a schematic diagram of an example of a control system for an oven according to an aspect of the present invention.

Now referring to FIG. 5, the oven 10 may include a control system 100 comprising a controller 102, a plurality of indicators 104 each associated with a pallet 50, a selector 106, and a memory 108. The motor 42 may also be considered part of the control system 100.

The controller 102 is operatively coupled to the motor 42, and is operable to activate and deactivate the motor 42. Optionally, the controller 102 may be further operable to control the speed at which the motor 42 rotates.

The memory 108 is operatively coupled to the controller 102, and stores data corresponding to food items and cooking times, with each food item being correlated to a cooking time as well as IR panel timings. Memory 108 may be any suitable form of computer memory, and may be adapted to be reprogrammed so that the data stored therein may be modified periodically.

Each indicator 104 is operatively coupled to the controller 102, and is operable to transmit an indicator signal to the controller 102 indicative of whether a particular pallet 50 is occupied or vacant. The indicators 104 may be spring loaded mechanical switches located in each pallet 50 that are depressed when a food item is placed on the pallet 50 and released when the food item is removed. Alternatively, the indicators 104 may comprise more sophisticated sensors.

A variety of other sensor arrangements can be provided. For example, for each pallet 50 there can be provided a mechanical or electrical counter that is mounted in the stationary position and which is triggered by a lever projecting from the main deck 60, which engages the counter every time the associated pallet 50 passes by. When a pizza or other food product is put on the pallet 50, the respective counter can be set for the desired number of revolutions to give the desired cooking time. Then, the counter counts down these revolutions, and when the last revolution is completed, it can be set to give some sort of warning signal, e.g. an audible and/or visual warning signal, to indicate that the particular food item is then cooked. Simultaneously, it can cause the rotation of the main deck 60 to be stopped, to hold that food item adjacent the access aperture 16. Providing the operator removes the food item promptly, or as detailed below this can be effected automatically, then this temporary halt in the rotation will have a minimal effect on the cooking time of the remaining food items in the oven 10. Preferably, a timer could be used instead of a counter.

To ensure that the pairs of levers and counters for each pallet 50 do not interfere with each other, the respective pairs can be spaced radially apart with respect to the main deck 60 or axially apart with respect to the axis of the main deck 60.

The selector 106 is operatively coupled to the controller 102, and is operable to transmit a first cooking signal and a second cooking signal to the controller 102. One of the first signal and the second signal will correspond to a selected food item. The first cooking signal and the second cooking signal may be different signals, or may be identical. The selector 106 may comprise a panel having a plurality of buttons to be pressed by a user, with each button corresponding to a selected food item. For example, a first button may correspond to pizzas, a second button to panzerotto, a third button to fruit pies, and a fourth button to cookies.

One example of a method of operation of the control system 100 is illustrated by reference to the flow chart 200 shown in FIG. 6.

At step 202, the controller 102 queries whether it has received a cooking signal from the selector 106. If no signal has been received, the controller 102 will continue to wait for such a signal. This initial signal may contain data indicative of the type of food that is to be cooked, or it may be a generic signal indicating that it is desired to insert a food item.

At step 204, upon receiving a cooking signal from the selector 106, the controller 102 will then check the indicator signals to determine whether the pallet 50 that will next rotate into alignment with the access aperture 16 is vacant. If this pallet 50 is vacant, then the controller 102 will proceed to step 205. If the indicator signal indicates that the next pallet 50 is occupied, then the controller 102 will query whether the next pallet 50 following the previously queried pallet 50 is vacant. This process will continue iteratively until a vacant pallet 50 is identified, or until all the pallets 50 have been found to be occupied. If the latter occurs, an error signal may optionally be provided.

In step 205, the controller 102 checks whether the vacant pallet 50 identified in step 204 has come into alignment with the access aperture 16. If the vacant pallet 50 is not yet in alignment, the controller 102 continues to check for such alignment. Once the vacant pallet 50 is in alignment with the access aperture 16, the controller 102 proceeds to step 206, in which the motor 42 is deactivated, leaving the main deck 60 stopped with the vacant pallet 50 aligned with the access aperture 16. Optionally, a signal, such as an audible beep, may be provided to alert an operator that the oven 10 is now ready to receive an additional food item.

At step 208, the controller 102 checks to see if an additional, second cooking signal has been received from the selector 106, to indicate that a food item has been inserted. If no cooking signal has been received, the controller 102 continues to check for the cooking signal. While the controller 102 continues to check, the main deck 60 remains stopped, which will provide an operator with an opportunity to insert a food item. Once the second cooking signal is received, the controller 102 proceeds to step 210.

As detailed below, the controller 102 can run multiple processes for different food items. For each of these food items, the controller 102 will be monitoring an overall cooking time. If while the main deck 60 is stopped for insertion of a fresh food item, the controller 102 detects that one or more other food items are coming close to the end of their cooking time, the controller 102 can override the stopped status of the main deck 60. Preferably, a short warning signal is given, in case an operator is in the midst of inserting a food item, and rotation of the main deck 60 is then recommenced, to bring the cooked food item adjacent the aperture 16 for removal. When there is some delay in inserting a fresh food item, this will ensure that cooked food items are removed promptly, without overcooking. Where automated insertion and removal of food items is provided, then this feature should not be required.

At step 210, the controller 102 will retrieve from the memory 108 the cooking time associated with the food item to which the first or second cooking signal from the selector 106 corresponds. It should be noted here that if the first cooking signal received at step 202 corresponds to a food item, step 210 may be carried out at any point after that cooking signal has been received.

Once the cooking time is retrieved and the second cooking signal has been received, the controller 102 proceeds to step 212, in which the motor 42 is activated, to cause the main deck 60 to rotate again. After step 212, the controller 102 not only proceeds to step 214, but also simultaneously initiates an additional process 200 in parallel with the process 200 that is already running. This new process 200 will commence at step 202. This will permit multiple items of food to be cooked simultaneously, as described in more detail below.

At step 214, the controller 102 checks to determine whether the cooking time retrieved in step 210 has elapsed. If the cooking time has not elapsed, the controller 102 will continue to check, and the main deck 60 will continue to rotate under the power of the motor 42. If the cooking time has elapsed, then the controller 102 will proceed to step 216.

At step 216, the controller 102 checks whether the pallet 50 is aligned with the access aperture 16. If the pallet 50 is aligned, the controller 102 proceeds to step 218, in which the motor 42 is deactivated so that the main deck 60 stops. If the pallet 50 is not aligned, the controller 102 continues to check until the pallet 50 is aligned.

By reference to steps 214 and 216, it can be seen that the food item on the pallet 50 will cook for slightly longer than its designated cooking time, i.e. by the amount of time it takes for the main deck 60 to complete its rotation. One skilled in the art will recognize that step 214 can be modified and carried out after step 216 to achieve the opposite result. In particular, in such a modified process the controller 102 would first check, at step 216, whether the selected pallet 50 is aligned with the access aperture 16, and would then check whether the difference between the elapsed time and the cooking time was less than a specified amount. Such an amount could correspond to the amount of time needed for the main deck 60 to make one complete revolution. If the difference were less than the specified amount, the controller 102 would then deactivate the motor 42 to cause the main deck 60 to stop rotating. If the difference were not less than the specified amount, the controller 102 would return to step 216.

Regardless of whether the food item is cooked for slightly longer than its designated cooking time, or slightly less than its designated cooking time, it will still generally cook for a time substantially equal to the designated cooking time. This will be particularly so when the main deck 60 is made to rotate at a relatively high number of revolutions per unit time. Thus, the main deck 60 is preferably operated at a relatively high number of revolutions per minute so that any differences between the designated cooking time and actual cooking time are small.

One skilled in the art will appreciate that the oven 10 may optionally be provided with mechanical means to automatically discharge a food item after the completion of the cooking process, and that such means may be made responsive to the controller 102. This is shown in FIG. 6 by step 220, illustrated with dashed lines, in which the controller 102 causes the food item to be discharged from the oven 10, and further details are given below.

It will also be appreciated that there are a variety of ways in which the controller 102 can determine whether a particular pallet 50 is aligned with the access aperture 16. A sensor (not shown) operatively coupled to the controller 102 may be disposed at the access aperture 16, with each pallet 50 having a unique identifier to permit the sensor to transmit a signal to the controller 102 indicating which pallet, if any, is aligned with the access aperture 16. Any such sensor should of course be heat-resistant if they are to be disposed within the oven 10. Alternatively, when precise gearing is used and the main deck 60 has an initial position in which a known pallet 50 is aligned with the access aperture 16, the controller 102 may be operable to count the number of revolutions, or fractions of revolutions, made by the main deck 60. Motor 42 may be a stepping motor to further enhance the efficacy of this method.

As noted above, the controller 102 may be adapted to have multiple methods 200 running in parallel. Specifically, the controller 102 may be operable to initiate an additional process 200, even when one or more processes 200 are already running, to permit multiple food items to be cooked individually according to their appropriate cooking time, even when the food items are inserted in a random order.

For example, an oven 10 may be adapted to cook pizzas, panzerotto, fruit pies, and cookies. Each of these food items would have a different cooking time at a given temperature of the oven 10, and the selector 106 may comprise four buttons, one corresponding to each food item. Pizzas could require 20 minutes to cook, panzerotto 10 minutes, fruit pies 40 minutes, and cookies 30 minutes.

Where individually operable cooking elements are provided, such as the overhead cooking elements 90 and 92 shown in FIG. 4a, these will be continuously turned on, and can be operated separately, to meet the cooking requirements of each selected item. For example, if it is required to provide overhead heat to a pizza, to balance the cooking action of the top as compared to the bottom, then one or more of the overhead elements 90, 92 can be pivoted down to give the top the desired amount of cooking or searing at the time most suitable.

In a specific example, a panzerotto has been cooking on a pallet 50 for approximately 5 minutes (Panzerotto—Step 214), and the operator of the oven 10 now wishes to bake a fruit pie. The operator will press a generic "Food Insertion" button, causing the selector 106 to transmit a cooking signal to the controller 102 (Fruit Pie—Step 202). When the next vacant pallet 50 (Fruit Pie—Step 204) is aligned with the access aperture 16 (Fruit Pie—Step 205), the controller 102 will then deactivate the motor 42 to stop the main deck 60 (Fruit Pie—Step 206). The operator could then place the fruit pie on the pallet 50, with the lip 55 preventing the fruit pie from being slid too far into the oven 10. The operator would then press a "Fruit Pie" button, causing the selector 106 to send a cooking signal to the controller 102 (Fruit Pie—Step 208) and causing the controller 102 to retrieve the cooking time corresponding to "fruit pies" from the memory 108 (Fruit Pie—Step 210). The controller 102 would then activate the motor 42 (Fruit Pie—Step 212) and begin to check whether the 40-minute fruit pie cooking time has elapsed (Fruit Pie—Step 214).

Approximately five minutes later, the controller 102 determines that the cooking time for the panzerotto has elapsed (Panzerotto—Step 214) and, once the pallet 50 on which the panzerotto is cooking is aligned with the access aperture 16 (Panzerotto—Step 216), the controller 102 stops the motor 42 (Panzerotto—Step 218), thereby stopping the main deck 60. The operator can then remove the panzerotto from the oven 10, or the panzerotto may be automatically discharged (Panzerotto—Step 220).

One skilled in the art will appreciate that in the example above, the generic "Food Insertion" button could have been omitted, and the operator could have pressed the "Fruit Pie" button twice: first to stop the main deck 60 with a vacant pallet 50 aligned with the access aperture 16, and then again to initiate the cooking process. Similarly, the oven 10 could have been configured so that the operator would first press the "Fruit Pie" button to indicate the type of food to be cooked and also stop the main deck 60 with a vacant pallet 50 aligned with the access aperture 16, and then pressed a generic "Start Cooking" button to begin the cooking process.

The control system 100 makes it possible for the oven 10 to cook a variety of different items, each having different cooking times, automatically. In addition to the examples set out above, the oven 10 could be used to cook hamburgers, artesian breads, casseroles, hot sandwiches and other food items.

The operator would simply have to press a button indicating that it is desired to cook an item, insert the item, and press a button to start the cooking process.

It will also be understood that the control inputs can permit variation for any particular item; for example, for pizzas, variations in cooking times, use of the radiant lamps etc. may need to be varied for pizzas with types of crust at different thicknesses and with different toppings.

Peel Mechanism

Reference will now be made to FIGS. 7-10 which show details of a peel mechanism 120. Commonly, in pizza ovens, pizzas are inserted, removed and otherwise manipulated by means of a peel, a peel usually being a large thin sheet, often made of wood, on the end of the handle, the sheet being thick enough and strong enough to support a pizza, but at the same time thin enough to enable it to be readily slid underneath the pizza to remove a pizza from the oven. Thus, as is known, the raw pizza is placed on the peel, the peel is placed in the oven, and then removed by rapid or snap action, so that the pizza slides off the peel onto the cooking surface of the oven. The process is reversed, to remove the pizza from the oven.

Where high volume production is an issue, forming a raw pizza on a peel with a handle and then transporting the peel to the oven is a major problem. The peel described is a split peel that allows the pizza to be formed in the production area on the peel head alone. A transfer element 122 is designed with features such as parallel sides, size outlines, and alignment holes that allow the raw pizza to be transported on a roller conveyor or stored in movable racks for automatic or semi automatic placement directly on the stone deck or platter in the oven.

Here, an automated split-peel mechanism 120 is provided, so as to ensure that each individual pizza or other food item is inserted and removed in a timely manner and that there is therefore no delay in removing food items, which could result in overcooking.

For this purpose, for each pizza, there is the individual support or transfer element 122. Each transfer element 122 is generally sheet form and has the characteristics of a conventional peel, although it does not need to have a great deal of strength or rigidity, as it will usually be supported by other elements, as detailed below; in other words, it can be relatively thin. The transfer element 122 has a pair of apertures 124, or other means, to enable it to be grasped or held by pins 154 of the apparatus. For example, instead of apertures 124, projections or other engagement elements can be provided.

In use, it is anticipated that individual pizzas would be assembled on individual transfer elements 122.

Figure 9:
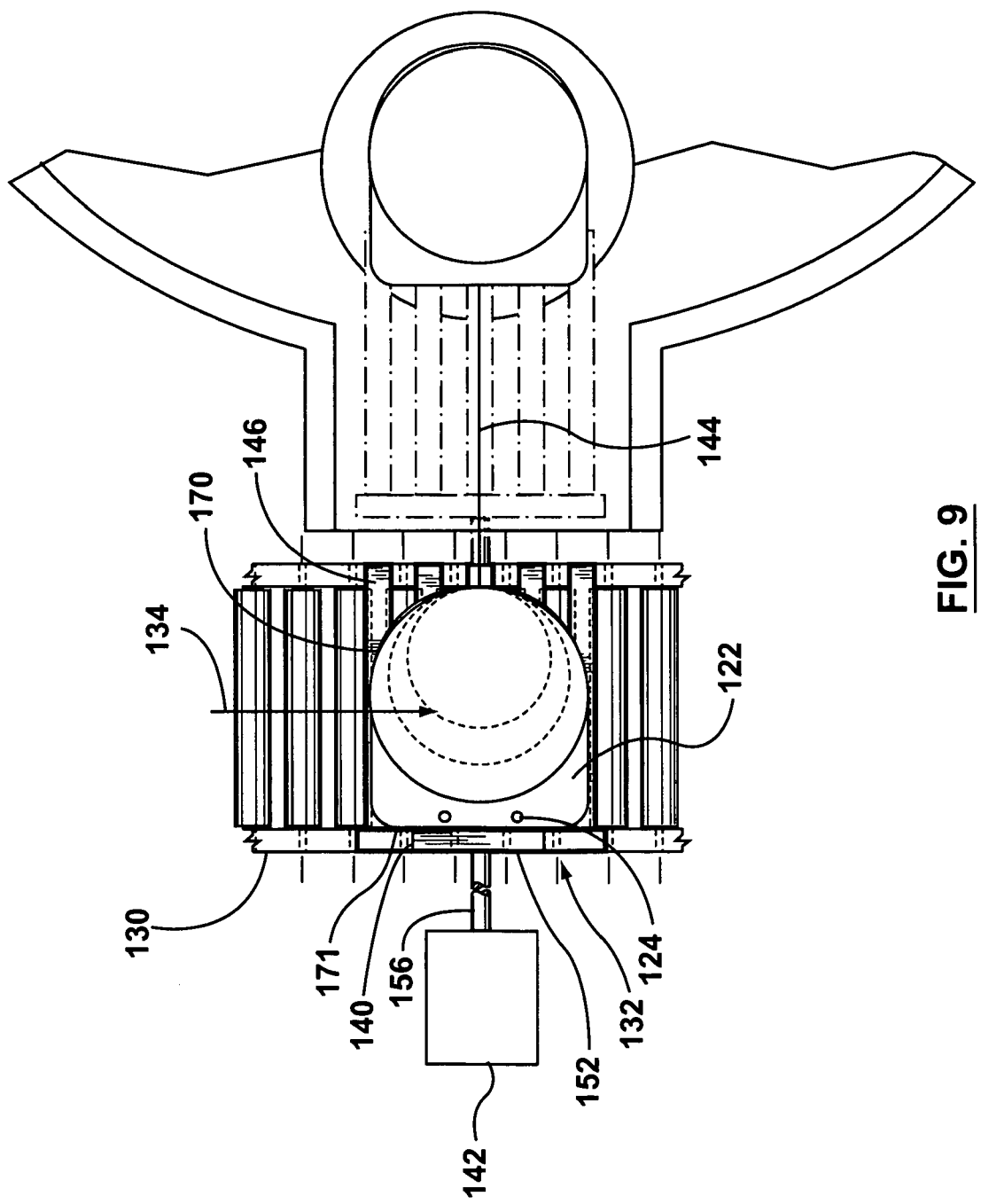
FIG. 9 is a plan view of the conveyor roller unit of FIGS. 7 and 8, also showing part of the oven.

One such transfer element 122 and a pizza 170 are shown in FIG. 9 (showing insertion into the oven 10 as explained in greater detail below). FIG. 9 also shows how the transfer element 122 can be used to assemble smaller pizzas indicated in dotted outline at 171.

Once pizzas 170 have been assembled on the transfer elements 122, they can conveniently be stored by placing the pizzas 170 and transfer elements 122 in storage racks, with the transfer elements 122 facilitating handling of the pizzas 170. Again, in the raw state, pizzas 170 are difficult to handle, and this will greatly speed up and facilitate handling of the pizzas 170 by unskilled personnel.

To feed the individual pizzas 170 to the oven 10, a roller conveyor 130 is provided adjacent the access aperture 16 of the oven 10. Just a transfer section 132 of the roller conveyor 130 adjacent the access aperture 16 is shown. The roller conveyor 130 can have any suitable length. Preferably, one side of the roller conveyor 130, on one side of the transfer section 132, provides an input section, where pizzas 170 or other food items can be placed in line, waiting insertion into the oven 10, while another portion of the roller conveyor 130 on the other side of the transfer section 132 is sufficiently long to store cooked food items that will come out of the oven 10. Although not shown, this output section can include known heat lamps or the like for keeping cooked food items warm.

The general direction of flow along the roller conveyor 130 can be varied as desired, and in many cases will be determined by a general is provided in two portions at either side of the cross member 148. Then, as shown in FIG. 10, two corresponding fixed cam elements 160 are provided, beneath the two outermost prongs 146, and means can be provided, e.g. side flanges, to keep the cam surfaces and cam elements 160 aligned.

Each fixed cam element 160 has, as viewed in FIG. 10a, on the left hand end a sloped portion 162, a generally flat portion 164 in the middle, and optionally at the right hand end, a downwardly sloped portion 166 and end, flat portion 168 of reduced height.

The effect of this cam profile is to determine the motion of the multi-pronged peel 140. Thus, with the peel 140 fully retracted (in an extreme left hand position as viewed in FIG. 10), the cam surface 158 rests on the end of the sloped portions 162, so that the prongs 146 are below the level of the individual rollers 136. In this position, a fresh transfer element 122 containing a pizza 170 or other food item can be rolled by the rollers 136 into the middle of the transfer section 132. The apertures 124 of the transfer element 122 can then be grasped by the pins 154.

The actuating mechanism 142 is then activated, to displace the multi-pronged peel 140 to the right. In the initial motion, the cam surfaces 158 ride up on the sloped portions 162, lifting the peel 140 upwards, so that the prongs 146 rise up above the level of the rollers 136.

With the peel 140 raised, the actuating mechanism 142 then displaced in through the access aperture 16, as indicated by the arrow 168 in FIG. 10.

Once the prongs 146 of the peel are above at least part of the main deck 60, where provided, the cam surfaces 148 will commence to move down the downwardly sloped portions 166 onto the flat portions 168 of reduced height. This enables the peel 140 and its prongs 146 to drop downwards as it is displaced further into the oven 10. This is one technique to ensure that the prongs 146 do not accidentally snag or catch an edge of the main deck 60. This may not be necessary in all cases, and, as detailed above, if sufficient tapering of the edge of the main deck 60 and other features are provided, it may be sufficient to have the prongs 146 slide across the bottom surface of the access aperture and then across the main deck 60.

The multi-pronged peel 140 with the transfer element 122 is then displaced further until it is directly above the respective pallet 50. Then, the actuating mechanism 142 rapidly or abruptly displaces the peel 140 rearwardly, with sufficient acceleration to cause a pizza 170 or other food item to be displaced off the transfer element 122 and to drop onto the cooking member 52 of the pallet 50.

The peel 140 is then fully retracted from the oven 10, so that rotation of the main deck 60 can recommence. If desired, some door or shutter mechanism can be provided for the access aperture 16. The transfer element 122 is then released, so that another transfer element 122, with another food item, can be rolled onto the peel 140.

Figure 10B:
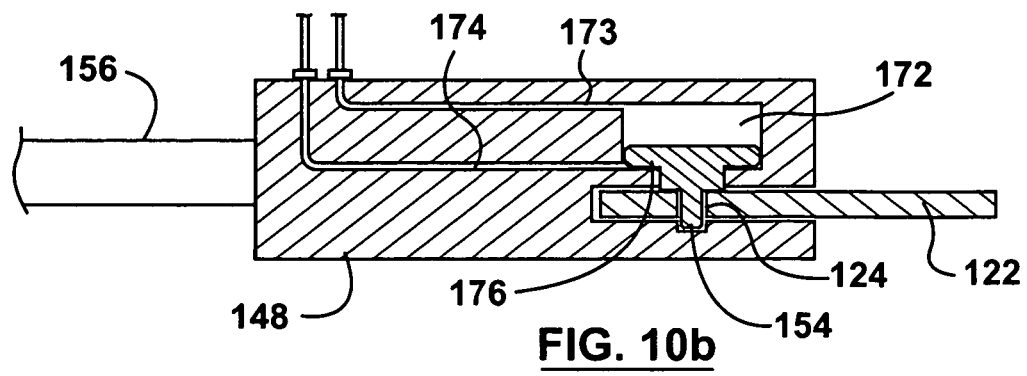
FIG. 10b is a vertical sectional view, on a larger scale, of part of a peel.
Figure 10C:
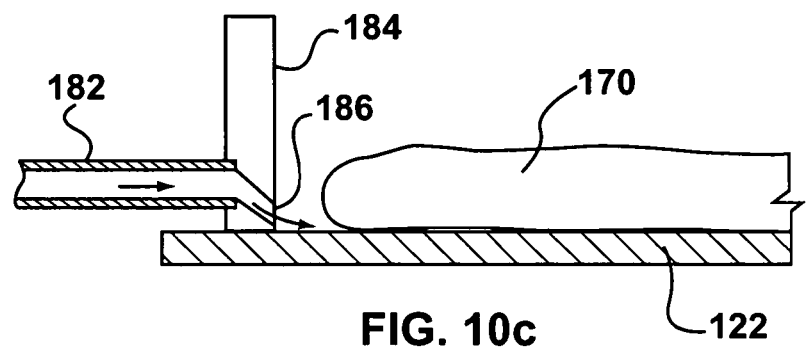
FIG. 10c is a detailed plan view of part of the peel.

FIGS. 10a, 10b and 10c show further details of a mechanism for attaching the transfer element 122 to the multi-pronged peel 140. The rear cross member 148 includes, for each pin 154, a piston chamber 172. The chamber 172 is provided with inlets 173, 174 for supply of air or other actuating fluid. Although not shown, the inlets 173, 174 for the two piston chambers 172 would be connected together in pairs, and connected to supply lines running through the actuation shaft 156. Each pin 154 is mounted on a respective piston 176.

Additionally, it will be understood by someone skilled in the art that it may not be necessary, for all purposes, to include two actuation air inlets for each piston chamber 172. Rather, it may be possible to have the piston 176 spring-biased into a start position; for example, a spring could be provided underneath each piston 176, biasing it upwards to the top of its respective piston chamber 172, so that it would then be necessary to provide the air inlets 173. In use, with air supplied to the inlets 173, the pistons 176 would be displaced downwards, causing the pins 154 to engage the apertures 124 of the transfer element 122. With air pressure released, the springs would cause the pistons 172 to move upwards, releasing the transfer element 122.

However, in the specific embodiment shown, air is supplied through the inlets 173 to cause engagement of the pins 154 in the apertures 124 of transfer element 122, to securely hold the transfer element 122. To release the transfer element 122, air is supplied to the inlets 174, displacing the pistons 176 upwards within their piston chambers 172, thereby to release the transfer element 122.

To facilitate displacement of a pizza from the transfer element 122, a pusher mechanism is provided, indicated at 180. The pusher mechanism 180 includes a tube 182 and a pusher head 184.

As shown in FIG. 10c, the pusher head 184 in a plan or top view is curved, to generally correspond to the circumference of the pizza 170, while recognizing that it will be used with pizzas of a number of different sizes, as such the radius should generally correspond to the radius of the largest pizza to fit on the transfer element 122. As also shown in FIG. 10c, the cross member 148 can be cut back or shaped to accommodate a pusher head 184.

Figure 10D:
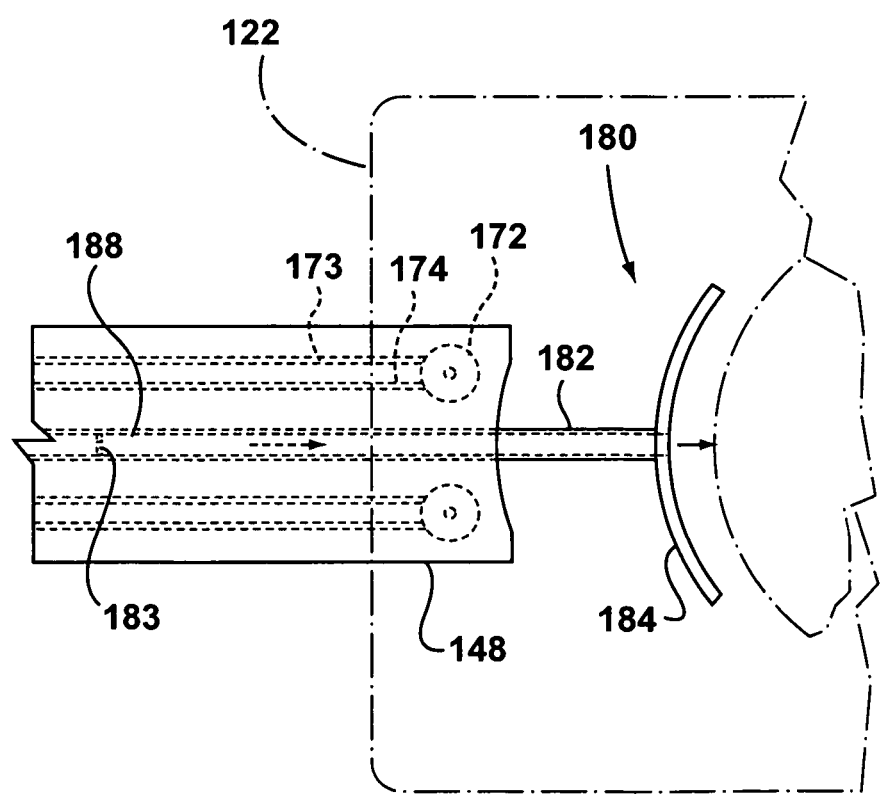
FIG. 10d is a further vertical sectional view, showing part of pizza.

As shown in the section view of FIG. 10d, the top of the pusher head 184 can be curved towards the pizza 170, to ensure positive engagement with the edge of pizza 170 to help direct the air flow under and around the pizza as the peel is snapped back. Additionally, this figure shows that the tube 182 is hollow and opens into an elongate channel of duct opening downwardly towards the transfer element 122 and indicated at 186.

The tube 182 is a sliding fit within a bore 188 within the rear cross member 148, and possibly extending into the actuation shaft 156, depending upon the dimensions selected for various components.

In use, the pusher head 184 has an initial position adjacent the rear cross member 148 and with the tube 182 slid to its maximum extent within the bore 188. To displace a pizza 170, air is supplied at a desired pressure to the bore 188. This has the effect of simultaneously tending to displace the pusher head 184 away from the cross member 148 and to supply a jet of air out through the discharge channel 186. The relative dimension of the tube 182 and discharge channel 186 are chosen to give a desired balance between air flow out through the channel 186 and pressure tending to push the pusher head 184 outwards. To regulate the various pressures, the tube 182 has an inlet orifice 183, to control air flow therethrough and air pressure tending to push the tube 182 out. Consequently, the pusher head 184 pushes against the edge of a pizza indicated at 170 in FIG. 10d and at the same time the jet from the discharge channel 186 is directed under the pizza 170, tending to lift it from the transfer element 122 and enable the pizza 170 to be dislodged from the transfer element 122 as it is being snapped back. The pressure applied by the pusher head 184 is just sufficient to cause it to abut a pizza 170, since a raw pizza is extremely soft. The intention is to ensure that the jet of air from the discharge channel 186 is directed under the pizza 170, so as to promote free movement of it off the transfer element 122 when this is abruptly moved backwards.

This technique can be use either by itself, or in conjunction with the technique mentioned elsewhere where one uses an abrupt or rapid acceleration of the transfer element 122 in one direction to promote displacement of a pizza 170 off the transfer element 122. Use of the air jet would allow for reduced use of a release agent such as corn meal, and greatly reduce the cleaning problems within the oven.

To return the tube 182 and pusher head 184 to their start position, either they can simply be manually displaced backwards until the pusher head 184 is adjacent to the cross member 148, or alternatively, a spring mechanism can be provided, tending to normally bias the tube 182 into the bore 188.

The peel 140 is then moved outwardly, in a controlled manner, so as not to displace the food item from it. As the peel 140 passes over the rollers 136 at the input section 132, it is initially raised above them, to maintain the food item on the prongs 146. As the peel 140 reaches its rearward position, the action of the fixed cam elements 160, 162 is to drop the prongs 146 down below the level of the rollers 136. Then, the food item can be displaced either manually or automatically by power rollers 136 where available, along the roller conveyor 130 to the output portion thereof.

When a pizza is cooked, the shell or crust becomes relatively stiff and has a reasonable amount of strength. Thus, provided it is supported at a number of points, e.g. as by the prongs 146, it will be stable. Once a pizza is cooked, a lot of the original moisture has been driven off by the cooking process, so it is also much lighter, again facilitating handling of it. Accordingly, in many cases it will be sufficient to use the bare prongs 146 to lift and remove an individual pizza or other food item.

For some food items, e.g. food items that are particularly thick, heavy and lacking in any sort of strength, it may be desirable to place an empty transfer element 122 on the prongs 146, before retrieving a food item from the oven 10. In this case, the food item is thus taken out of the oven 10 on the transfer element 122, essentially as a reverse of the procedure for insertion of the food item.

Figure 11:
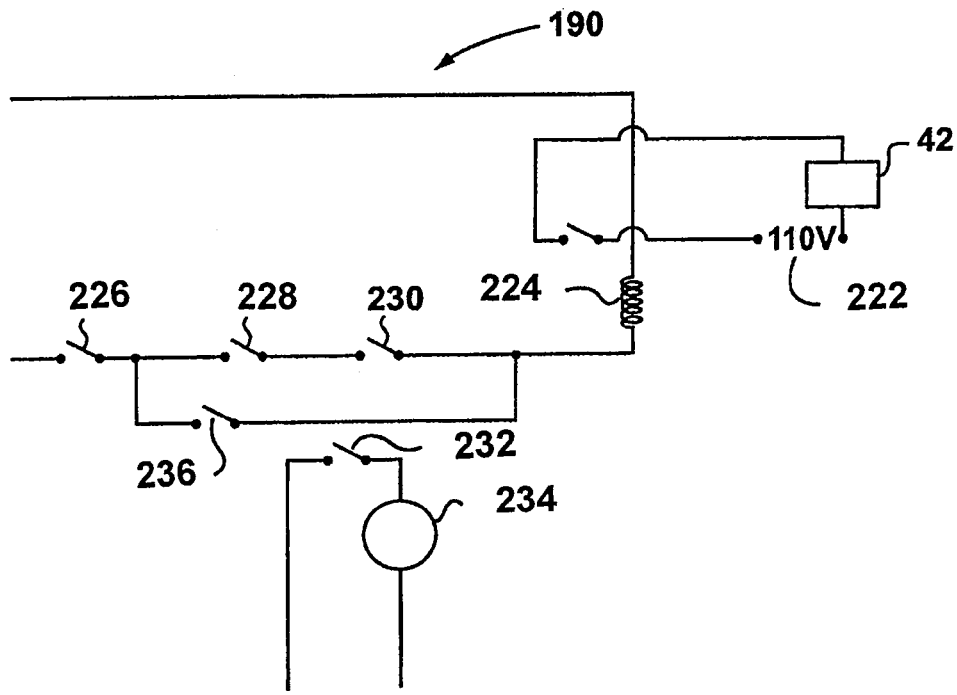
FIG. 11 is schematic of a control circuit in accordance with the present invention.
Figure 12:
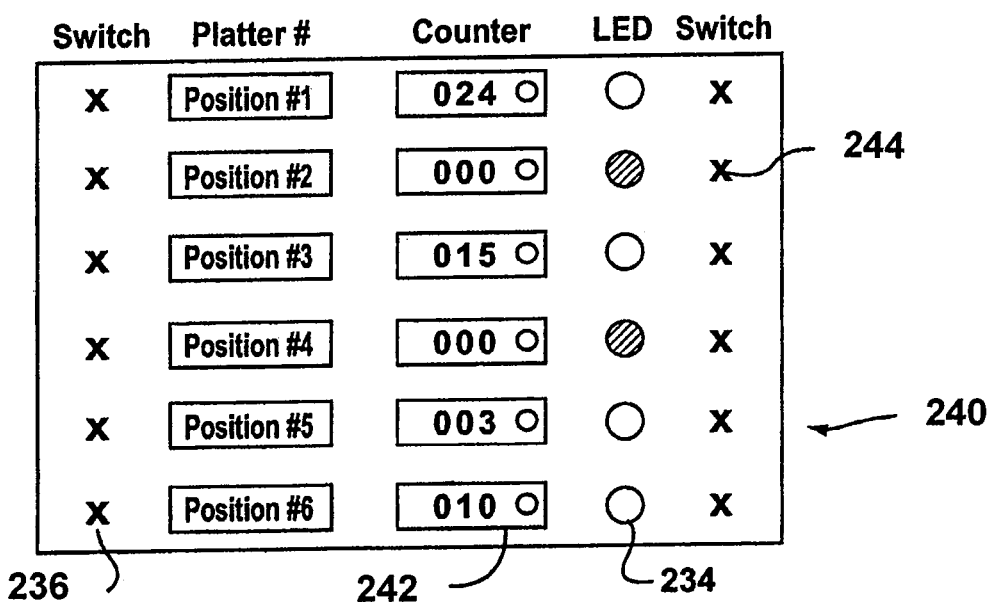
FIG. 12 is a view of a control for use with control circuits as shown in FIG. 11.

Reference will now be made to FIGS. 11 and 12, which show an alternative control mechanism, intending to be simple and robust including a control circuit 190 for one plate.

Referring to FIG. 11, the drive motor 42 is shown connected to a power supply 222 through the contact of an actuation solenoid 224. The solenoid 224 has its own power supply controlled by switches 226, 228 and 236 and one pole 230 of a double pole single throw switch. The second pole 232 of this switch controls actuation of an indicator LED 234.

The elements 226 through 236 are for a single pallet 50, as detailed below. These elements are provided separately for each pallet 50, with each of the associated circuits being connected, in effect, in parallel within the actuation circuit for the solenoid 224. The solenoid 224 is normally closed, and when actuated or powered, opens to interrupt operation of the motor 42. Thus, should any one of the parallel control circuits for the individual pallets 50 be put into a closed condition, then power is supplied to the solenoid 224, opening its contacts and stopping operation of the motor 42.

For each pallet control circuit, switch 226 is a cam-operated micro switch, actuated by the position of the main deck 60. Thus, for each pallet 50, when the main deck 60 reaches a position where the respective pallet 50 is adjacent the access aperture 16, the respective micro switch 226 is closed. The switch 226 is not closed just instantaneously but is closed for some sufficient period of time, corresponding to the pallet 50 being adjacent the aperture 16. It will be understood that even when power is turned off to the motor 42, it will continue to rotate if only momentarily, so that the motor 42 and main deck 60 will not come instantaneously to a halt. Thus, the switch 226 and a respective actuating cam are configured to keep it closed for sufficient period of time to allow the main deck 60 to come to a stopped condition.

Switch 228 is a switch of a timer system, explained below, that is open at the start of a cooking period and is closed once the set cooking period has expired.

The poles 230 and 232, as mentioned, are two poles of a double pole single throw switch, configured so that when one pole is closed the other pole is open. With the respective pallet 50 carrying a pizza or other food item, pole 230 is closed and pole 232 is open, so that the switches 226 and 228 control when the motor 42 is stopped, and at the same time the indicator LED 234 is not lit.

Switch 236 is an oven stop to load switch, that enables manual override of the oven and the drive mechanism, to permit a food item to be loaded onto an empty pallet 50.

FIG. 12 shows the control panel 240, assuming that the main deck 60 bears six individual pallets 50, and it will be understood that the number of pallets can be varied as desired for a particular installation and dependent upon the size of pizzas, other food items, etc. Switches 236, form a manual override to stop of movement of the main deck 60 as shown on the left hand side. Corresponding to each pallet 50, there is a respective counter or timer indicated at 242, and respective LEDs are indicated at 234. For these LEDs, the LEDs in the second and fourth position are shown shaded, to indicate that they are lit, and correspondingly the counters for these two locations are shown at zero, indicating that cooking of a food has terminated and it has been removed from the oven 10 leaving these pallets at positions 2 and 4 empty.

The double pole single throw switches, with the pole pairs 230, 232, are indicated at 244, there again being one such switch 244 for each respective pallet 50.

As noted, in normal usage, the switches 244 are usually switched to have the poles 230 closed and the poles 232 open. This leaves the LEDs 234 turned off. For each pallet, the cam-operated micro switch 226 will close every time the respective pallets adjacent the access aperture 16. When a food item is placed on a respective pallet 50, the corresponding timer is set to a desired time, and for example the counters 242 can show unexpired time in seconds. While a counter 242 is counting down, the corresponding switch 228 is open.

Consequently, for each pallet 50, the motor 42 will be permitted to run until the counter 242 counts down to zero, when the switch 228 will close. The respective switch 226 will still be open, until the corresponding pallet 50 is adjacent the access aperture 16; when this occurs, the switch 226 will then close. With all of the switches 226, 228 and 230 then closed, the solenoid 224 will be actuated to interrupt power to the motor 42.

The food item can then be removed from the pallet 50, and, if desired, a fresh pizza or other food item placed on the pallet 50. The respective timer 242 is then reset, opening the contact or switch 228 and restarting the motor 42.

If it is intended to leave the respective pallet 50 empty, i.e. there is no food item waiting to be cooked, then the respective switch 244 is actuated, to open the pole 230 and close the pole 232. Closing the pole 232 lights the LED 234, to indicate the respective pallet 50 is empty, while opening the pole 230 ensures that operation of the motor 42 can recommence.

When it is desired to stop the main deck 60 to place a food item onto an empty pallet 50, the switch 236 is closed, and is opened to restart the motor 42. Then, when the respective pallet 50 reaches the access aperture 16, closure of its micro switch 226 will actuate the solenoid 224, again stopping the motor 42.

A food item can then be placed on that pallet 50, the corresponding counter 242 can be set, and the respective switch 228 will then be opened. It can be provided that resetting the counter 242 automatically opens the corresponding switch 228 and switches the corresponding switch 244 to a position with its pole 232 open and pole 230 closed.

It will be understood that FIG. 11 shows the basic elements for automatic operation, and that other control elements can be provided. For example, it will likely be desirable to have a main control switch for the power supplied to the motor 42, in addition to the control solenoid 224.

When a food item is completely cooked, as detailed above, the main deck 60 is stopped with the respective pallet 50 adjacent the access aperture 16. The multi-pronged peel 140 is then displaced from its rearward position shown in FIG. 10 into the oven 10, as detailed above. Again, the prongs 146 are lifted up, and where the portions 166, 168 are provided for the fixed cam elements, the prongs 146 will drop down onto the main deck 60. The prongs 146 are then slid across the main deck 60, across the cooking member 52 of the pallet 50 and under the food item. In known manner, this action is preferably done sufficiently rapidly that frictional forces between the prongs 146 and the pizza 170 or other food item do not tend to displace it significantly. As noted, the main deck 60 is provided with an inner flange 65, in case the pizza 170 or other food item is unintentionally displaced too far. Additionally, either the presence of a lip 55 on the individual pallet 50 or the stopping member 56 will prevent a pizza 170 being pushed inwards.

Figure 6:
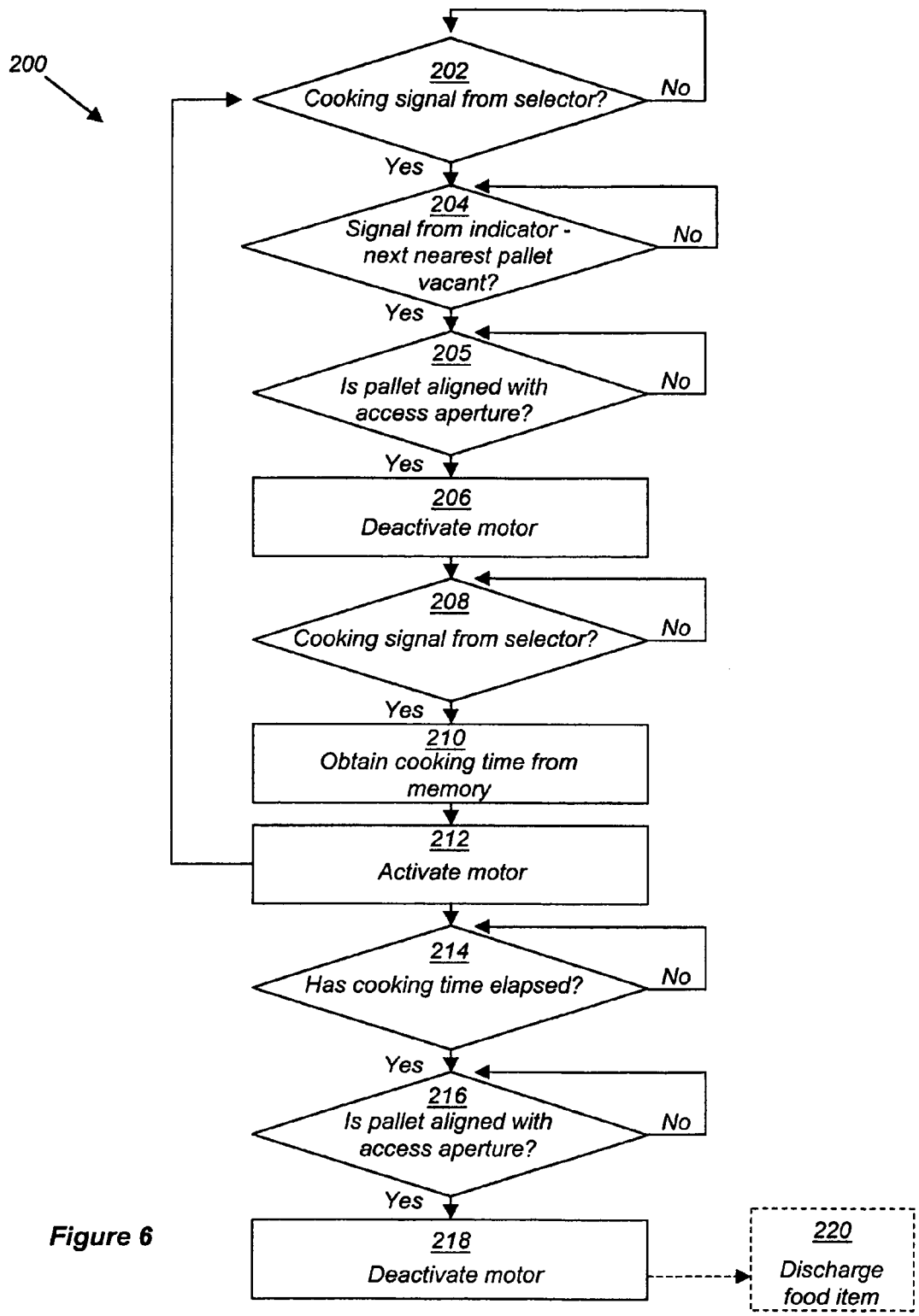
FIG. 6 is a flow chart showing an example of a method of operation of the control system of FIG. 5.
Figure 7:
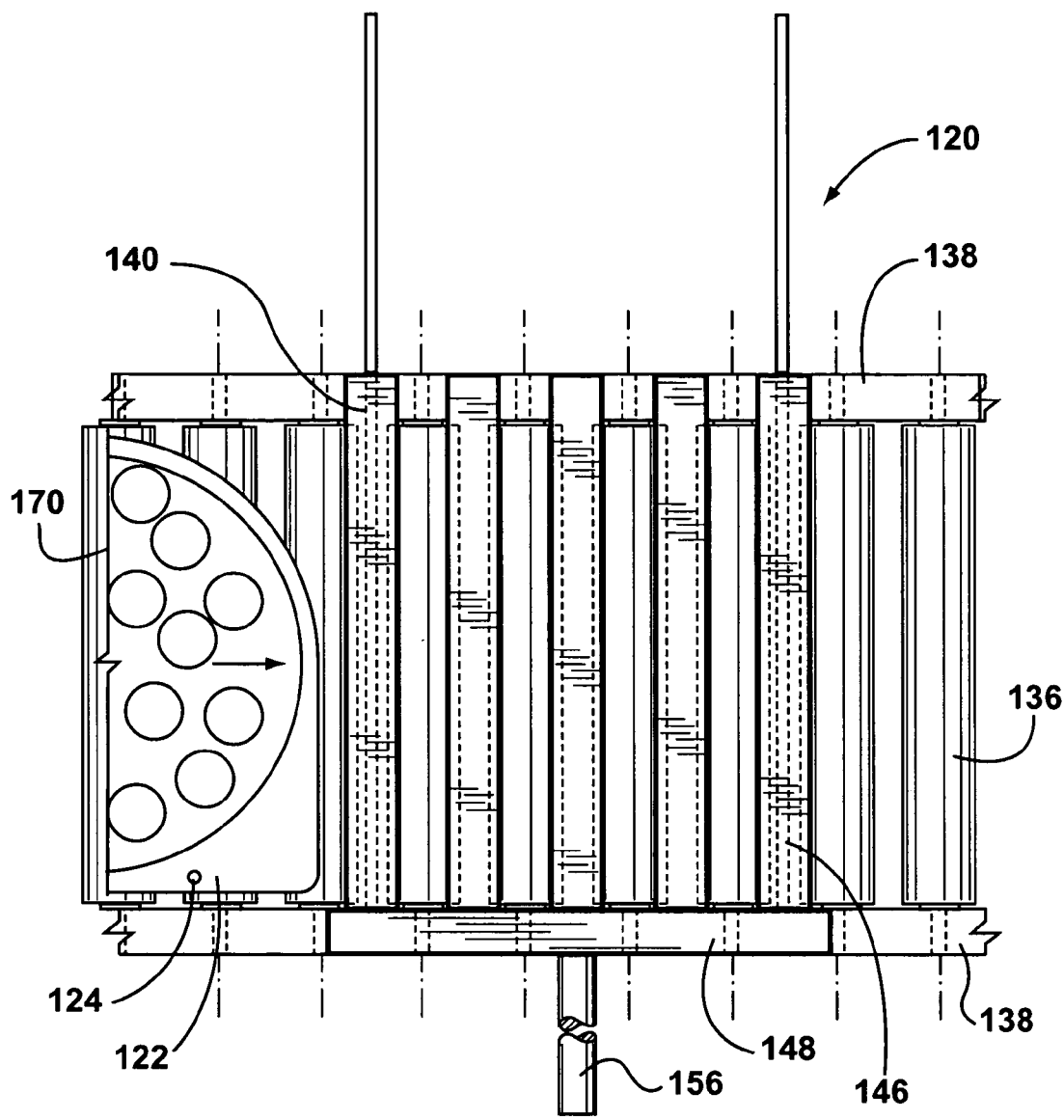
FIG. 7 is a plan view of part of a conveyor roller unit of the present invention.
Figure 8:
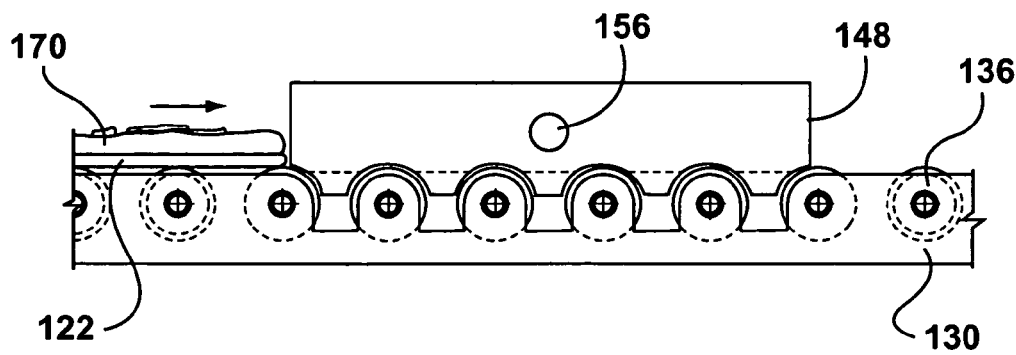
FIG. 8 is a side view of the conveyor roller unit of FIG. 7.

As for the control technique described in relation to FIGS. 5 and 6, the control panel 240 and associated circuitry can include a provision to control actuation of the infrared panels or lamps 90.

It will be appreciated that the oven 10 and control system 100 of the present invention provide an efficient method of automatically picking individual food items on a "made to order" or "a la carte" basis, in a restaurant atmosphere. All of the food items are cooked in a single oven 10, which can be relatively simple, rugged and inexpensive. By providing a main heat source 20 with small logs, an overall classic wood burning taste and atmosphere can be provided.

The automatic control of the oven 10 means that the level of operator skill is reduced, and that it can be operated by a single operator, while cooking a large variety of different food items. Each food item can be provided with its own cooking sequence, independently of other food items. This is achieved either by the control input through the selector 106; it can also be provided, automatically, by providing barcodes or other readable data associated with each food item. For example, the different food items could be associated with unique types of dishes, and each dish could be provided with a barcode or other data that is read by sensors, to control the oven 10.

An important aspect of the present invention is the speed of rotation of the deck 60. Preferably, this rotates at a speed that is relatively high. It is understood that many earlier proposals for ovens with rotating platforms have implicitly assumed that each food item would proceed through one circuit in the oven.

In contrast, the present invention intends that each food item would travel through multiple circuits around the oven. For example, the main deck 60 can be rotated at a speed of 10 rpm, so that each pallet 50 would be brought adjacent to the aperture 16 once every six seconds. An advantage of this arrangement, is detailed above; the necessary steps of removing and inserting food items will require the main deck 60 to be stopped and started frequently, so that the time that an individual pallet 50 is brought adjacent to the aperture 16 will likely not coincide exactly with the precise cooking time. Rather, at the end of a cooking time for a particular food item, it will be necessary to bring pallet 50 adjacent to the aperture 16 either slightly before or slightly after its theoretical cooking time. When it takes only six seconds for each revolution of the deck 60, this means that any degree of under or over cooking will be so slight as not to be noticeable, and in effect, to be well within acceptable tolerances on the cooking time.

This also recognizes that, with many modern cooking techniques, it is possible to cook many items in a relatively short time. For example, it is now possible to completely cook a pizza in 45 seconds if the right combination of heat sources is used.

The mechanism detailed above can be provided for automatic ejection of food items upon completion of cooking. This will speed up overall throughput for the oven and reduce operator time. Also, automatic ejection means that there is no delay in waiting for an operator to remove a food item.

The use of gearing in association with a stepper motor can ensure precise location of each pallet 50 at the aperture 16, when required. This can also allow for forward and reverse movement of the deck 60, as required.

It will also be understood that, while it is preferred to provide a fully automated motor operation with computerized or other process control equipment, it is possible to provide a simplified version of the oven relying on electromechanical control.

It is also to be understood that the central location of the heat source 20 is believed to be important. Many wood fired ovens have the fire or heat source off to one side. This results in uneven heat distribution throughout the oven. In such an oven, rotation of pizzas throughout the oven would result in uneven or uncontrolled cooking, and parts of the cooking surface may either be too hot or too cold to be practically of any use. With the present invention, central location of the heat source of fire ensures that there is uniform distribution of heat and that food items can be cooked in a controlled manner.

It will further be appreciated by one skilled in the art that numerous variations and modifications may be made to the embodiments described above without departing from the scope of the present invention, and all such variations and modifications are intended to be encompassed within the scope of the present invention as defined by the appended claims.

The invention claimed is:
1. An oven comprising:
a main housing defining an interior space, the main housing having an access aperture;
a heat source for providing heat within the housing;
a substantially horizontal main deck, rotatably mounted within the housing, the main deck having a plurality of identifiable cooking positions disposed thereon;
a source of motive power coupled to the main deck for driving the main deck to revolve within the housing;
a controller operatively coupled to the source of motive power, the controller operable to activate and deactivate the source of motive power;
a memory operatively coupled to the controller for storing data corresponding to food items and cooking times, each food item being correlated with an associated cooking time;
a plurality of indicators, each indicator associated with a cooking position on the main deck, each indicator operatively coupled to the controller, each indicator operable to transmit an indicator signal to the controller indicative of whether its associated cooking position is occupied or vacant; and
a selector operatively coupled to the controller, the selector operable to transmit a first cooking signal and a second cooking signal to the controller, at least one of the first cooking signal and the second cooking signal corresponding to a selected food item;
wherein, upon receiving the first cooking signal from the selector, the controller uses indicator signals from the plurality of indicators to identify a vacant cooking position and deactivate the source of motive power when the vacant cooking position is aligned with the access aperture, and wherein, upon receiving the at least one of the first cooking signal and the second cooking signal that corresponds to the selected food item from the selector, the controller retrieves a cooking time associated with the selected food item from the memory, and wherein, upon receiving the second cooking signal from the selector, the controller activates the source of motive power to cause the main deck to rotate for a time substantially equal to the cooking time and then deactivates the source of motive power to cause the main deck to stop rotating when the selected food item is aligned with the access aperture,
wherein each cooking position comprises a substantially horizontal pallet rotatably mounted in the main deck, and wherein each pallet is driven to rotate relative to the main deck,
wherein the oven further comprises a transmission system, the transmission system operatively coupling the source of motive power to the main deck to drive the main deck to revolve within the housing, the transmission system further operatively coupling the source of motive power to the pallets to drive the pallets to rotate relative to the main deck.
2. The oven of claim 1, wherein the transmission system constrains the number of revolutions made by each pallet during a single revolution of the main deck to a whole number.

* * * * *